(12) United States Patent
Yabusaki et al.

(10) Patent No.: US 7,590,334 B2
(45) Date of Patent: Sep. 15, 2009

(54) MOTOR CONTROLLER

(75) Inventors: Hitoshi Yabusaki, Londonderry, NH (US); Alejandro G. Milesi, Ciudad de Buenos Aires (AR); Shaun D. Milano, Chichester, NH (US); Nevenka Kozomora, Manchester, NH (US); Michael C. Doogue, Manchester, NH (US)

(73) Assignee: Allegro Microsystems, Inc., Worcester, MA (US)

( * ) Notice: Subject to any disclaimer, the term of this patent is extended or adjusted under 35 U.S.C. 154(b) by 115 days.

(21) Appl. No.: 11/835,721

(22) Filed: Aug. 8, 2007

(65) Prior Publication Data
US 2009/0039807 A1 Feb. 12, 2009

(51) Int. Cl.
H02P 5/06 (2006.01)
H02P 6/20 (2006.01)

(52) U.S. Cl. ............. 388/811; 318/400.06; 318/400.17; 318/599

(58) Field of Classification Search ............ 318/400.05, 318/400.06, 400.24, 400.26, 254, 439, 430, 318/599, 400.17; 388/811; 363/98
See application file for complete search history.

(56) References Cited

U.S. PATENT DOCUMENTS

| | | |
|---|---|---|
| 3,743,911 A | 7/1973 | Erler |
| 5,045,920 A | 9/1991 | Vig et al. |
| 5,264,783 A | 11/1993 | Vig et al. |
| 5,389,889 A | 2/1995 | Towne et al. |
| 5,442,283 A | 8/1995 | Vig et al. |
| 5,517,112 A | 5/1996 | Vig et al. |
| 5,581,179 A | 12/1996 | Engel et al. |
| 5,619,137 A | 4/1997 | Vig et al. |
| 5,621,319 A | 4/1997 | Bilotti et al. |
| 5,650,719 A | 7/1997 | Moody et al. |
| 5,686,894 A | 11/1997 | Vig et al. |
| 5,694,038 A | 12/1997 | Moody et al. |
| 5,708,578 A * | 1/1998 | Stoddard et al. .............. 363/98 |
| 5,729,130 A | 3/1998 | Moody et al. |
| 5,917,320 A | 6/1999 | Scheller et al. |

(Continued)

FOREIGN PATENT DOCUMENTS

DE 198 04 597 A1 8/1998

(Continued)

OTHER PUBLICATIONS

Datasheet, Allegro A1441, "Low-Voltage Full-Bridge Brushless DC Motor Driver with Hall Element Commutation", 2005, 2006, 4 pages.

(Continued)

Primary Examiner—Paul Ip
(74) Attorney, Agent, or Firm—Daly, Crowley, Mofford & Durkee, LLP

(57) ABSTRACT

In one aspect, a control circuit to control a speed of a motor includes a PWM oscillator configured to generate a PWM output signal having a duty cycle. The speed of the motor is controlled by the PWM output signal to be proportional to the duty cycle. The control circuit also includes a duty cycle control circuit responsive to a duty cycle selection signal and coupled to the PWM oscillator. The duty cycle control circuit is configured to compare a voltage reference and a supply voltage. The duty cycle control circuit controls the duty cycle of the PWM output signal to be inversely proportional to the supply voltage.

25 Claims, 26 Drawing Sheets

U.S. PATENT DOCUMENTS

| | | | |
|---|---|---|---|
| 6,181,092 B1 * | 1/2001 | Turner | 318/400.32 |
| 6,563,284 B2 * | 5/2003 | Teutsch et al. | 318/599 |
| 6,819,069 B2 * | 11/2004 | Hornberger et al. | 318/400.12 |
| 7,030,584 B1 * | 4/2006 | Alberkrack | 318/400.03 |
| 7,148,642 B2 * | 12/2006 | Brannen et al. | 318/400.06 |
| 7,276,867 B2 * | 10/2007 | Alberkrack et al. | 318/400.24 |
| 2002/0060544 A1 * | 5/2002 | Teutsch et al. | 318/599 |
| 2005/0212501 A1 * | 9/2005 | Acatrinei | 323/283 |
| 2006/0097677 A1 * | 5/2006 | Brannen et al. | 318/439 |
| 2006/0097678 A1 * | 5/2006 | Alberkrack et al. | 318/439 |
| 2006/0208821 A1 * | 9/2006 | Alberkrack | 332/128 |
| 2006/0238154 A1 * | 10/2006 | Brannen et al. | 318/439 |
| 2008/0272724 A1 * | 11/2008 | Hayashi | 318/430 |

FOREIGN PATENT DOCUMENTS

| | | |
|---|---|---|
| EP | 0 252 898 A | 1/1988 |
| JP | 01 170386 A | 7/1989 |

OTHER PUBLICATIONS

Datasheet, Allegro A1442, "Low Voltage Full Bridge Brushless DC Motor Driver with Hall Commutation and Soft-Switching, and Reverse Battery, Short Circuit, and Thermal Shutdown Protection", 2005, 2006, 8 pages.

Datasheet, Allegro A1444-A1445, "Low-Voltage Full-Bridge Brushless DC Motor Driver with Hall Commutation, Externally Controlled Speed Regulation, Soft-Switching, Reverse Battery and Short Circuit/Thermal Shutdown Protection", 2006, 12 pages.

Datasheet, Sanyo, LB11961V, "Monolithic Digital IC—Single-Phase Full-Wave Fan Motor Driver", Mar. 2007, 7 pages.

Datasheet, Sanyo, LB11970FV, "Monolithic Digital IC—Single-Phase Full-Wave Driver", Mar. 2007, 7 pages.

Datasheet, Melexis, MLX90283, "BLDC Vibration Motor Driver" Oct. 2007, 10 pages.

Datasheet, Sanyo LB11975, "High-Speed CD-ROM Spindle Motor Driver IC", Jan. 2001, 12 pages.

Invitational to Pay Additional Fees and, Where Applicable, Protest Fee, PCT/US2008/069919 dated Feb. 13, 2009.

Freescale Semiconductor: "H-Bridge Gate Driver IC Document No. MC33883" [Online], Jan. 1, 2007, XP007906846.http:..www.freescale.com/files/analog/doc/data_sheet/MC33883.pdf, [retrieved on Jan. 16, 2009], pp. 1, 10; figure 1.

Notification of International Search Report and Written Opinion of the International Searching Authority for PCT/US2008/069919, dated Apr. 1, 2009, 22 pages.

* cited by examiner

MOTOR CONTROLLER

BACKGROUND

Various motor controller circuit configurations are known. One such configuration is the H-bridge or full bridge configuration in which four transistors are configured in an H pattern with the motor coil coupled to form the bridge of the H configuration. The transistor switches are controlled in pairs such that when a first pair of switches conduct, a first voltage signal is provided to the motor coil to cause a current to flow in a first direction through the coil, and when the second pair of switches conduct, a second voltage signal is provided to the motor coil to cause the current to flow through the coil in the opposite direction. The rate of turning on and off the transistor pairs controls the speed of the motor. The voltage signal provided by the motor driver circuit to the motor coil is referred to herein as the motor signal.

The speed of the motor may be determined from a rotor commutation signal that is generated by converting the magnetic field generated by a rotating motor element, such as an alternating pole ring magnet, to an electrical signal with the use of a magnetic field-to-voltage transducer, such as a Hall effect element. The output signal of the Hall effect element has a voltage proportional to the magnetic field and can be processed to generate a pulse train commutation signal having a period proportional to the motor speed.

Generally, a motor is started by the motor signal having a 100% duty cycle in order to achieve a predetermined motor speed at the fastest rate possible. The duty cycle of the motor signal can then be reduced from the 100% duty cycle to a lesser duty cycle in order for the motor speed to be maintained at the predetermined motor speed. In one particular example of a motor, a single-phase brushless motor, a 100% duty cycle is generated when one transistor pair is conducting 50% of the time and the other transistor pair is conducting the other 50% of the time.

SUMMARY

In one aspect, a control circuit to control a speed of a motor includes a PWM oscillator configured to generate a PWM output signal having a duty cycle. The speed of the motor is controlled by the PWM output signal to be proportional to the duty cycle. The control circuit also includes a duty cycle control circuit responsive to a duty cycle selection signal and coupled to the PWM oscillator. The duty cycle control circuit is configured to compare a voltage reference and a supply voltage. The duty cycle control circuit controls the duty cycle of the PWM output signal to be inversely proportional to the supply voltage.

In another aspect, a control circuit to control a speed of a motor includes a timer configured to measure from a first time based on an activation signal and to provide an enable signal based on the timer reaching a second time, and a PWM sequencer responsive to a duty cycle selection signal and configured to generate a PWM output signal having a duty cycle. The speed of the motor is controlled by the PWM output signal to be proportional to the duty cycle and the PWM output signal is generated in response to the enable signal and the duty cycle selection signal.

In a further aspect, a control circuit configured to control a speed of a motor includes comparator circuitry configured to evaluate a rotor commutation signal having a frequency proportional to the speed of the motor using a clock reference signal having a fixed frequency and to provide an enable signal in response to the evaluation. The control circuit also includes a PWM sequencer configured to generate a PWM output signal having a duty cycle. The speed of the motor is controlled by the PWM output signal to be proportional to the duty cycle, and the PWM output signal is generated in response to a duty cycle selection signal and the enable signal.

In a still further aspect, a control circuit to control a speed of a motor includes comparator circuitry configured to receive a clock reference signal having a fixed frequency and a rotor commutation signal having a frequency proportional to the speed of the motor and to provide an enable signal in response to the speed of the motor being below a predetermined threshold. The control circuit also includes power control circuitry configured to place transistors in an H-bridge circuit in an off state based on the enable signal.

DESCRIPTION OF THE DRAWINGS

The foregoing features of the invention, as well as the invention itself may be more fully understood from the following detailed description of the drawings, in which.

DETAILED DESCRIPTION

Described herein is a motor controller 10. In one embodiment, the motor controller 10 includes a pulse-width modulation (PWM) control circuit (e.g., a PWM control circuit 38 (FIG. 1A)) to provide a PWM signal. The PWM control circuit, in conjunction with other components within the motor controller 10, is used to control a speed of the motor including setting the speed of the motor to a predetermined speed, maintaining the motor at the predetermined speed even over variations in a supply voltage and reducing the speed of the motor during braking. In another embodiment, motor controller 10 may receive from an external device a control signal that may include the PWM signal at a multifunction port (e.g., a multifunction port 916 (FIG. 12)). The same multifunction port may also be used to perform additional functions including starting the motor, braking the motor and placing the motor in a sleep mode. In one example, the motor controller 10 may be completely or partially embodied in one or more integrated circuits.

Figure 1A:
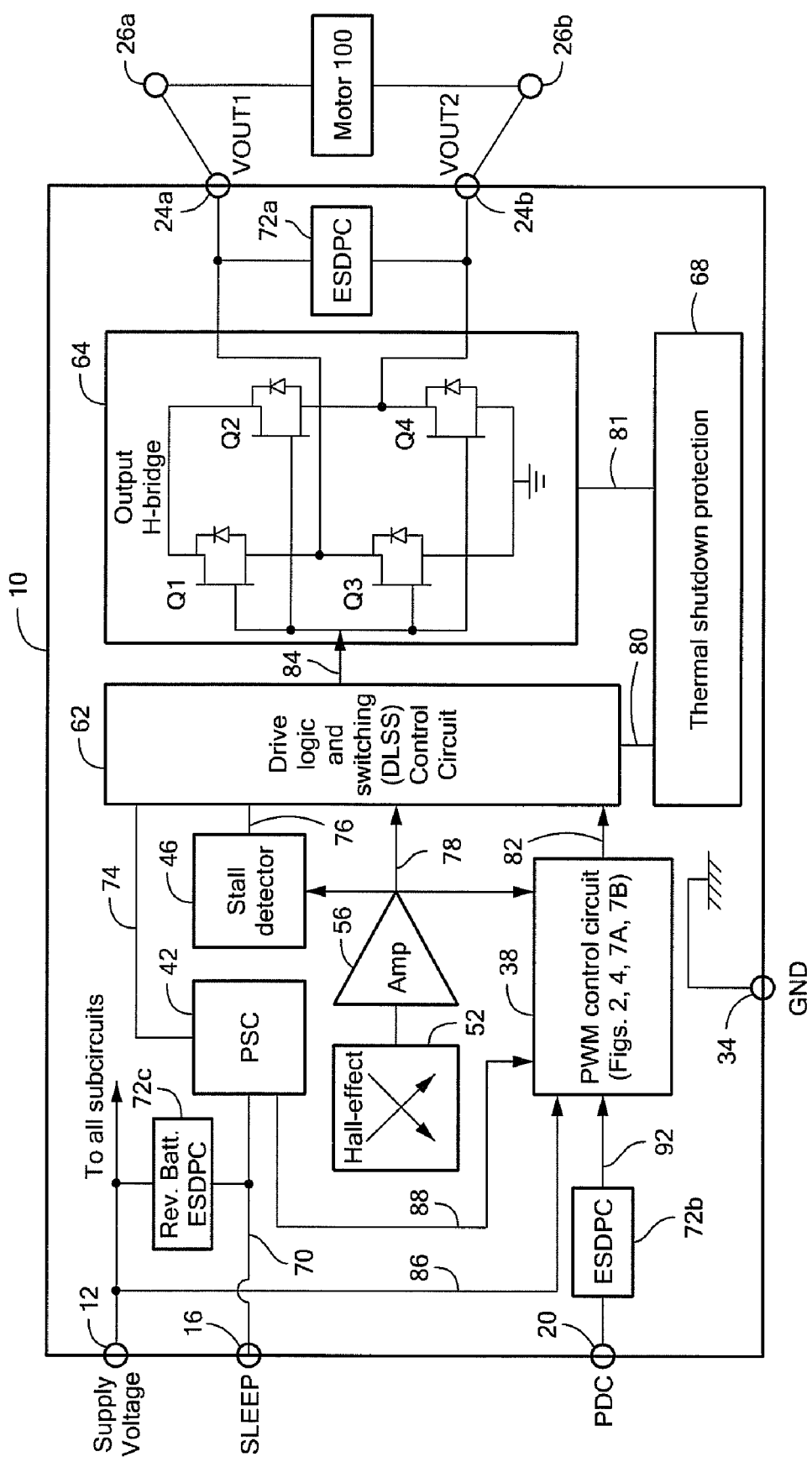
FIG. 1A is a circuit diagram of an example of a motor controller.

Referring to FIG. 1A, the motor controller 10 controls the speed of a motor 100 (e.g., a DC brushless motor). The motor controller 10 includes a supply voltage port 12 to receive a supply voltage to power components on the motor controller, a sleep port 16 adapted to receive a signal for the purpose of placing portions of the motor controller 10 in a sleep mode (as described further below), a PWM duty cycle (PDC) port 20 to set the duty cycle of a motor signal provided to the motor 100, output ports 24a, 24b at which the motor signal is provided for coupling to terminals 26a, 26b of the motor 100, respectively, and a ground port 34 to ground components on the motor controller 10.

A user may control the speed of the motor 100 by providing an appropriate input control signal (e.g., a voltage signal) at the PDC port 20. In one example, the input control signal provided at the PDC port 20 may be a selected one of a plurality of signals, each signal being associated with a respective duty cycle of the motor signal provided at output ports 24a, 24b, and thus being associated with a respective desired motor speed. For example, a 5-volt DC signal applied at the PDC port 20 may correspond to a 75% duty cycle and a zero volt signal may correspond to a 25% duty cycle. As another example, the PDC port 20 may be unconnected (i.e., allowed to float) resulting in a voltage at the PDC port 20 of between one-third and two-thirds of the supply voltage, which may correspond to a 50% duty cycle. In one example (e.g., the motor 100 is a brushless motor), a 100% duty cycle corresponds to a first voltage signal being provided at the ports 24a, 24b 50% of the time and a second voltage signal provided at the ports 24a, 24b the other 50% of the time.

Motor controller 10 allows control of the motor speed based on a finite range of duty cycles. For example, by allowing a user to set the duty cycle externally (i.e., external to the motor controller 10) by applying a selected one of three voltage levels to PDC port 20 to choose from three discrete duty cycles, for example, a duty cycle variation of less than +/−5% may be achieved over a full range of temperature and semiconductor wafer processing parameters. In other examples, a PWM signal may be supplied externally (see, for example, FIG. 12) thereby eliminating the need for the PDC port 20.

The motor controller 10 also includes the PWM control circuit 38, a power and sleep control (PSC) circuit 42, a stall detector 46, a Hall effect circuit 52, an amplifier 56, a drive logic and self-switching (DLSS) control circuit 62, an H-bridge circuit 64 and a thermal shutdown protection circuit 68. The motor controller 10 further includes electrostatic discharge (ESD) protection circuitry (ESDPC) (e.g., an ESDPC 72a between the output ports 24a, 24b; an ESDPC 72b at the PDC port 20 and an ESDPC 72c between the sleep port 16 and the supply voltage port 12) to protect the circuit components on the motor controller 10 from electrostatic charges at the ports 12, 16, 20, 24a, 24b. In one example, motor controller 10 is an integrated circuit with the ports 12, 16, 20, 24a, 24b, 34 being pins.

The DLSS control circuit 62 is configured to receive DLSS input signals as described below. In general, the DLSS control circuit 62 provides four DLSS output signals through a bus 84 (e.g., a serial bus) to the H-bridge circuit 64 in response to the DLSS input signals received. Each of the four DLSS output signals is provided to a corresponding transistor (e.g., a first transistor Q1, a second transistor Q2, a third transistor Q3, a fourth transistor Q4) in the H-bridge circuit 64 to generate the motor signal at the ports 24a, 24b.

Figure 1B:
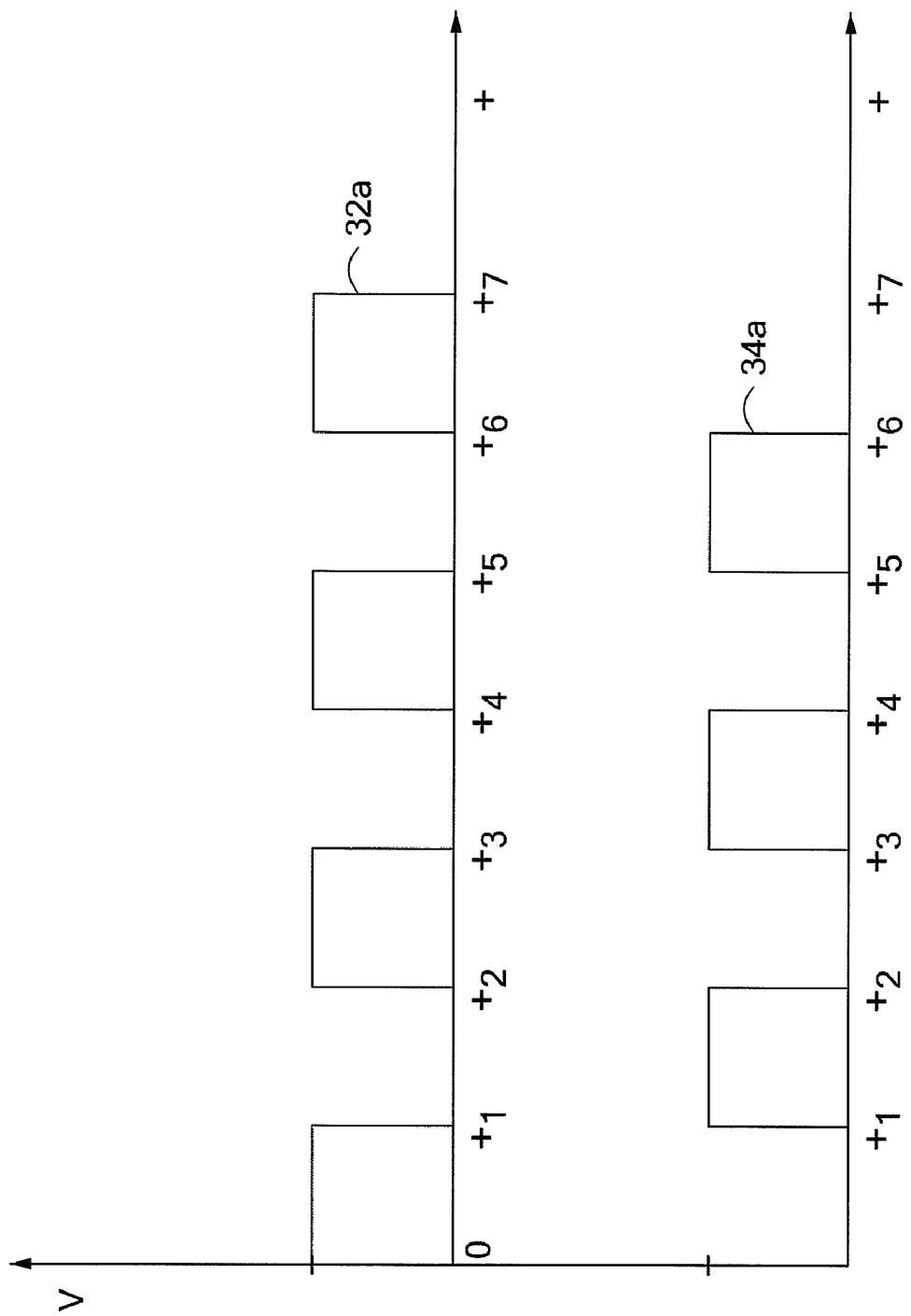
FIG. 1B is a timing diagram of output voltage signals for the motor controller of FIG. 1A.

In one example, when transistor pair Q1, Q4 are conducting, they provide a first voltage signal at the ports 24a, 24b and when transistor pair Q2, Q3 are conducting they provide a second voltage signal at the ports 24a, 24b. In one particular example (e.g., the motor 100 is a brushless motor), at 100% duty cycle, transistor pair Q1 and Q4 conducts 50% of the time providing a first voltage signal 32a (FIG. 1B) while transistor pair Q2 and Q3 conduct the other 50% of the time providing a second voltage signal 34a (FIG. 1B).

Figure 1C:
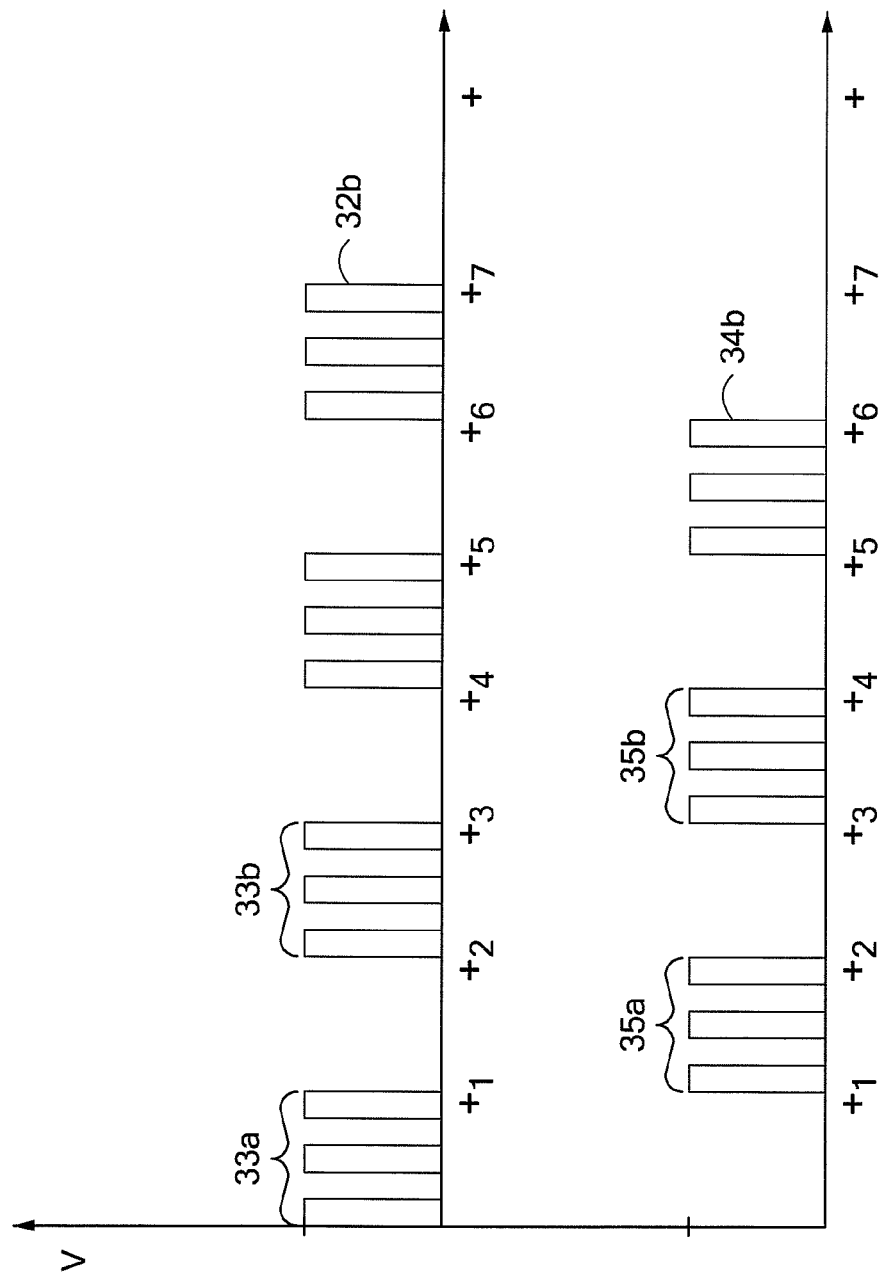
FIG. 1C is another timing diagram of output voltage signals for the motor controller of FIG. 1A.

In some applications, it is undesirable to have transistors pairs (e.g., the transistor pair Q1, Q4 and the transistor pair Q2, Q3) conducting continuously for a duration because of the high current introduced at the ports 24a, 24b. For example, in the case of a motor stall (or at low speeds), the current will be higher than when the motor 100 is spinning due to back electromotive force. For instance, in the example above (for the motor 100 being a brushless motor in FIG. 1B), at a 100% duty cycle, it is undesirable for the transistor pair Q1, Q4 to provide a continuous high voltage level during the entire time duration between zero and $t_1$, $t_2$ and $t_3$ and so forth for the first voltage signal 32a and likewise it is undesirable for the transistor pair Q2, Q3 to provide a continuous high voltage level between $t_1$ and $t_2$, $t_3$ and $t_4$ and so forth for the second voltage signal 34a. Rather, as seen in FIG. 1C, the transistor pair Q1, Q4 may provide a first voltage signal 32b at the ports 24a, 24b in the form of pulse trains (e.g., a pulse train 33a between 0 and $t_1$, a pulse train 33b between $t_2$ and $t_3$ and so forth) and the transistor pair Q2, Q3 may provide a second voltage signal 34b at the ports 24a, 24b in the form of pulse trains (e.g., a pulse train 35a between $t_1$ and $t_2$, a pulse train $t_3$ and $t_4$ and so forth). In one example, the first voltage signal 32b and the second voltage signal 34b may be produced by allowing one of the transistors in each transistor pair to float periodically to reduce the current and then be reconnected (e.g., transistor Q1 is periodically disconnected and reconnected). In another example, one of the transistors from the opposite transistor pair is turned on periodically. For example, transistor Q3 is turned on periodically to reduce the current in transistor Q1. In one example, DLSS 62 controls the turning on and off of transistors Q1, Q2, Q3, Q4. To avoid a short circuit between the supply voltage and ground, transistors Q1 and Q3 are not on at the same time, and the transistors Q2 and Q4 are not on at the same time.

In one example of a DLSS input signal, a sleep control signal is provided by the PSC circuit 42 to the DLSS control circuit 62 through a connection 74 in response to the sleep port 16 being enabled (i.e., an enabling signal applied to the sleep port 16 and coupled to the PSC circuit 42 via the connection 70). In one example, the enabling signal results from the sleep signal applied at the sleep port 16 transitioning from a high to a low voltage level. The DLSS control circuit 62 places the transistors in the H-bridge 64 in the sleep mode (i.e., the transistors Q1, Q2, Q3, Q4 are turned off and most other circuitry in the motor controller 10 is disabled) in response to receiving the sleep control signal.

In another example of a DLSS input signal, a stall signal is provided by the stall detector 46 to the DLSS control circuit 62 through a connection 76 when the motor 100 is stalling. The stall detector 46 determines that the motor 100 is stalling based on the rotor commutation signal received. The rotor commutation signal is generated by the Hall effect circuit 52. The Hall effect circuit 52 senses a magnetic field from the motor 100 (e.g., detecting a position of an alternating-pole ring magnet from the motor 100) and generates a signal, referred to herein as the rotor commutation signal, having a period proportional to the motor speed which is further amplified by the amplifier 56 and provided to the stall detector 46 through a connection 78. In one example, additional circuitry (not shown) may be included to convert a signal from the Hall effect circuit 52 from a sine wave to a pulse train. For example, the sine wave signal is chopped, sampled, passed through a low-pass filter, gained up and fed into a comparator with a Schmitt trigger so that the rotor commutation signal 78 is represented as a pulse train. As is known, there are different types of Hall effect elements, for example, a planar Hall element, and a vertical Hall element. In other embodiments, the Hall effect circuit may be replaced by any magnetic field sensor. For example, the magnetic field sensor may include a magnetotransistor or any one of different types of magnetoresistance elements, for example, a giant magnetoresistance (GMR) element, an anisotropic magnetoresistance element (AMR), a tunneling magnetoresistance (TMR) element, and a magnetic tunnel junction (MTJ).

If the stall detector 46 determines that the speed of the motor 100 is below a stall speed threshold based on the rotor commutation signal, the stall signal is provided to the DLSS control circuit 62, which in turn increases the duty cycle of the motor signal to prevent the motor 100 from stalling. In one example, the DLSS 62 initiates an anti-stall algorithm which turns the output on and off, in the polarity determined by the Hall commutation circuitry, in order to prevent the undesirable condition where full current is flowing in a stalled motor. The anti-stall algorithm may continue until rotation occurs or the sleep signal is low, for example. The various connections described herein may be referred to herein interchangeably with the signal carried by the respective connection. For example, reference character 78 may be used interchangeably to refer to the connection between the amplifier 56 and the stall detector 46 and to the rotor commutation signal associated with such a connection.

Figure 5A:
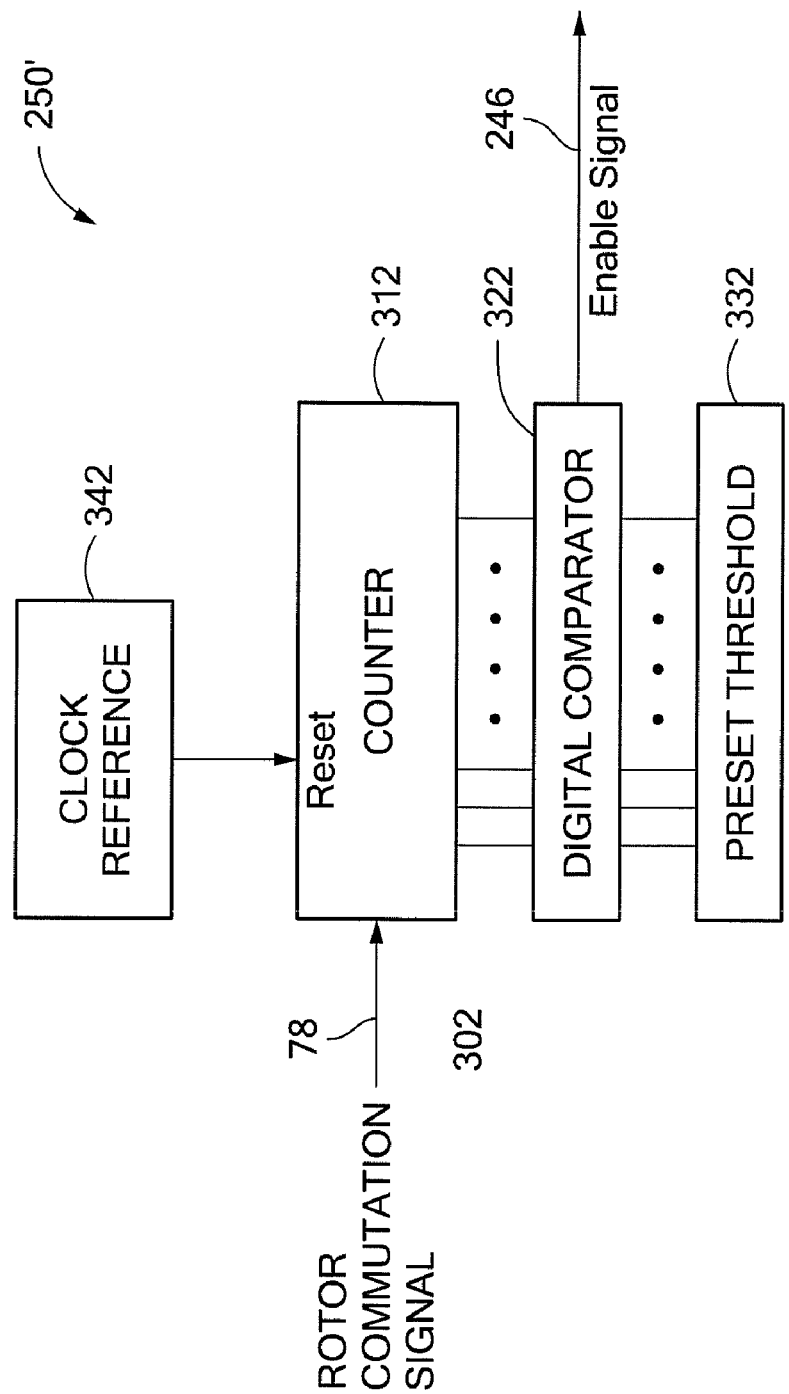
FIGS. 5A, 5B and 5C are circuit diagrams of examples of the speed-threshold comparator circuit of FIG. 4.

In a further example of a DLSS input signal, the rotor commutation signal 78 is provided directly to the DLSS control circuit 62 from the amplifier 56 through the connection 78 to provide a feedback signal to monitor the speed of the motor 100. The feedback signal 78 is also fed into speed detection circuitry (FIGS. 5A and B). During the 100% duty cycle mode, the Hall effect circuitry 52 determines which pair of transistors is on and which is off (i.e., a direction of current flow through the motor 100) which determines the direction of rotation of the motor so that the magnetic pole in the motor 100 (e.g., the north pole or the south pole) will determine what pair of transistors is actively switching.

In another example of a DLSS input signal, a thermal shutdown signal is provided by the thermal shutdown protection circuit 68 through a connection 80 when it detects the motor is overheating. In one example, the thermal shutdown protection circuit 68 measures, at the H-bridge circuit 62 through a connection 81, a forward voltage of a diode (not shown) having a known temperature transfer curve. For example, a known parameter temperature characteristic (e.g., a diode knee voltage) is compared to a fixed (non-temperature dependent) reference. When their difference reaches a desired threshold, the thermal shutdown circuitry 68 provides the thermal shut-down signal. Upon receipt of the thermal shutdown signal, the DLSS control circuit 62 turns off one or more of the transistors Q1, Q2, Q3, Q4.

As further described below, the PWM control circuit 38 provides a PWM output signal through a connection 82 to the DLSS control circuit 62 based on at least one of: the supply voltage received from a connection 86 to the supply voltage port 12 (see, for example, FIGS. 7A and 7B); an activation signal provided by the PSC circuit 42 (see, for example, FIG. 2) through a connection 88; and the rotor commutation signal 78 received from the Hall effect circuit 52 via the amplifier 56 (see, for example, FIG. 4). The PWM output signal 82 has a duty cycle corresponding to an input control signal provided at the PDC port 20 and provided to the PWM control circuit 38 through a connection 92. In one example, the PWM control circuit 38 controls the speed of the motor 100 (after a predetermined timed has lapsed, for example, or the motor 100 has achieved a predetermined speed, in another example) by causing the output signal 84 (a motor control signal) of the DLSS control circuit 62 to change from a 100% duty cycle signal down to a duty cycle determined by the user using the PDC port 20.

As will become apparent from consideration of several embodiments of the PWM control circuit described below in connections with FIGS. 2, 4, 7A and 7B, for example, some of the input signals to the PWM control circuit 38 are optional in the sense that not all of the input signals are used in all of the PWM control circuit embodiments.

Figure 2:
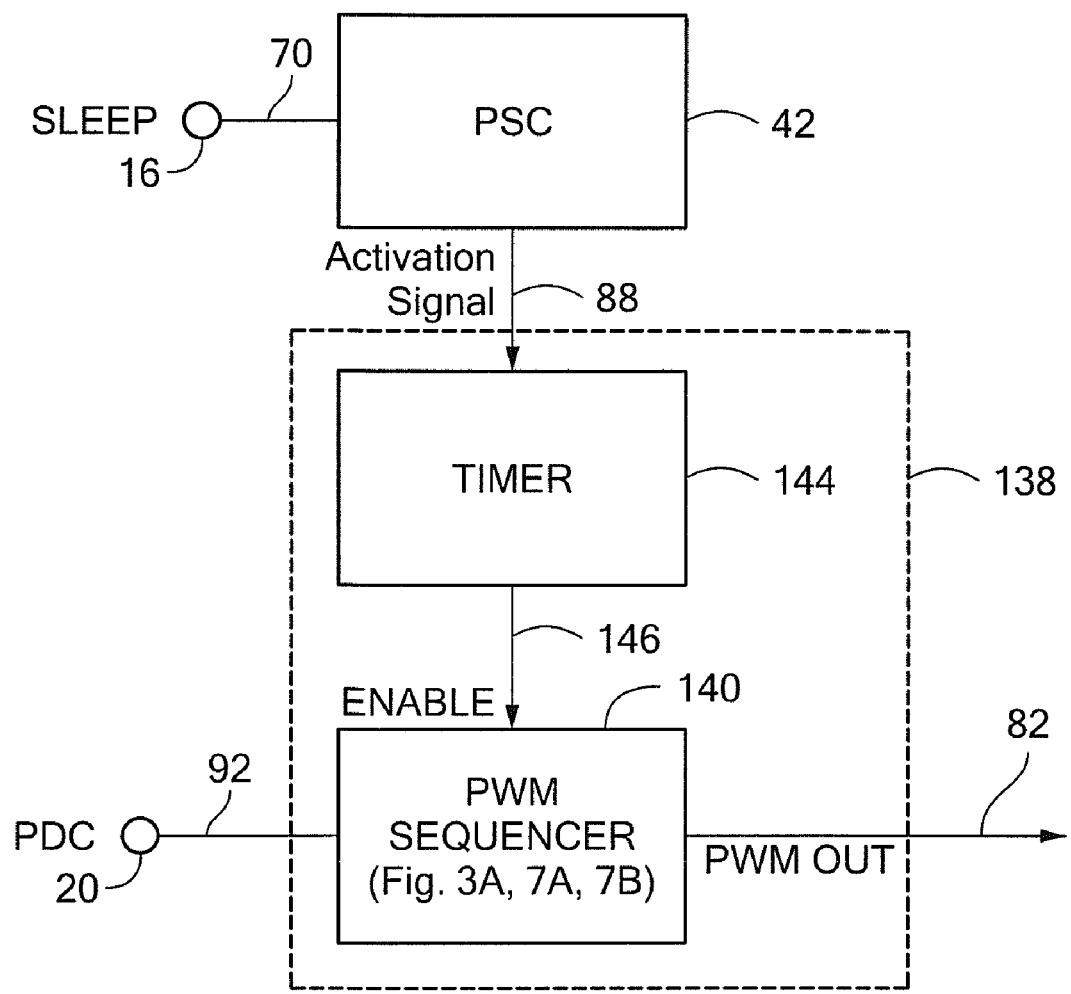
FIG. 2 is circuit diagram of an example of a pulse-width modulation (PWM) control circuit of FIG. 1A including a timer.

Referring to FIG. 2, an example of the PWM control circuit 38 is a PWM control circuit 138 that includes a PWM sequencer 140 and a timer 144 coupled to the PWM sequencer by a connection 146. The activation signal 88 from the PSC circuit 42 is coupled to the timer 144, as shown.

In one example, if a sleep mode is enabled, a PWM output signal 82 is not provided by the PWM sequencer 140. Upon the occurrence of the sleep mode being disabled, the DLSS 62 provides a 100% duty cycle signal at the ports 24a, 24b (e.g., as shown in FIG. 1B or 1C) and the PSC circuit 42 provides the activation signal through the connection 88 to start the timer 144. After a predetermined amount of time has elapsed (i.e., corresponding to the time it takes for the motor 100 to achieve a predetermined motor speed), the timer 144 provides an enable signal 146 to the PWM sequencer 140, which in turn provides the PWM output signal 82 based on the input control signal received at the PDC port 20. In one example, the timer 144 is a countdown timer. In one example, the timer may be adjusted by circuitry (not shown) to account for different selected duty cycles by detecting a voltage level for the duty cycle selected.

Figure 3A:
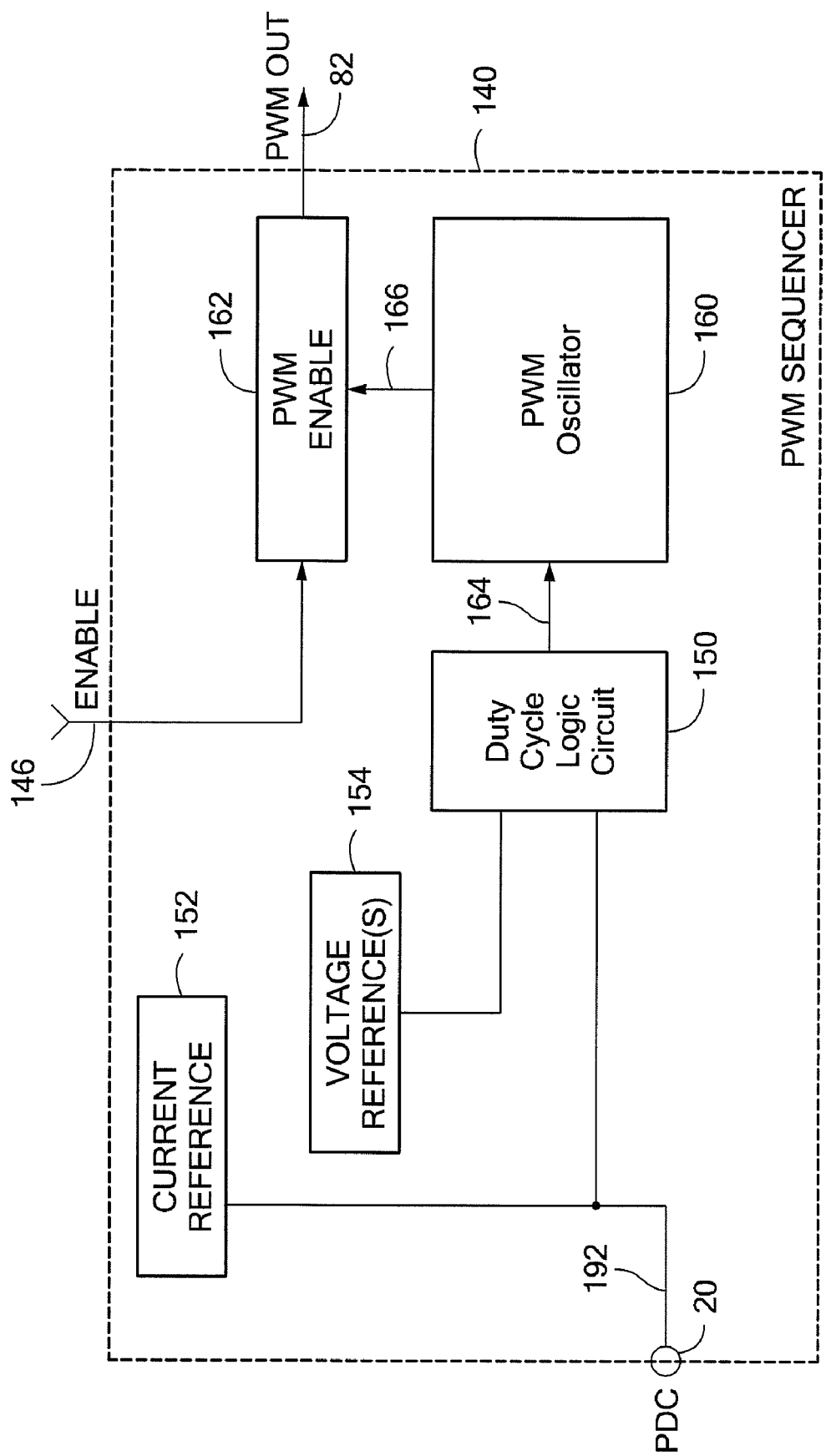
FIG. 3A is a circuit diagram of an example of a PWM sequencer of FIG. 2.

An example of the PWM sequencer 140 (FIG. 2) is depicted in FIG. 3A. The PWM sequencer 140 includes a duty cycle logic circuit 150 coupled to a current reference source 152 and voltage references 154 (which may includes one or more reference voltages), and a PWM oscillator 160 coupled to the duty cycle logic circuit 150 by a connection 164 and to a PWM enable circuit 162 by a connection 166. In one example, a resistor (not shown for simplicity) is coupled to the PDC port 20 external to the motor controller 10 such that a voltage is provided at the PDC port 20 as a function of the current from the current reference 152 flowing through the resistor. The duty cycle logic circuit 150 compares the voltage at the PDC 20 with the voltage references 154 and provides a duty cycle control signal 164 to the PWM oscillator 160. The duty cycle control signal 164 is used by the PWM oscillator 160 to provide a PWM oscillator output signal 166 to the enable circuit 162.

Figure 3B:
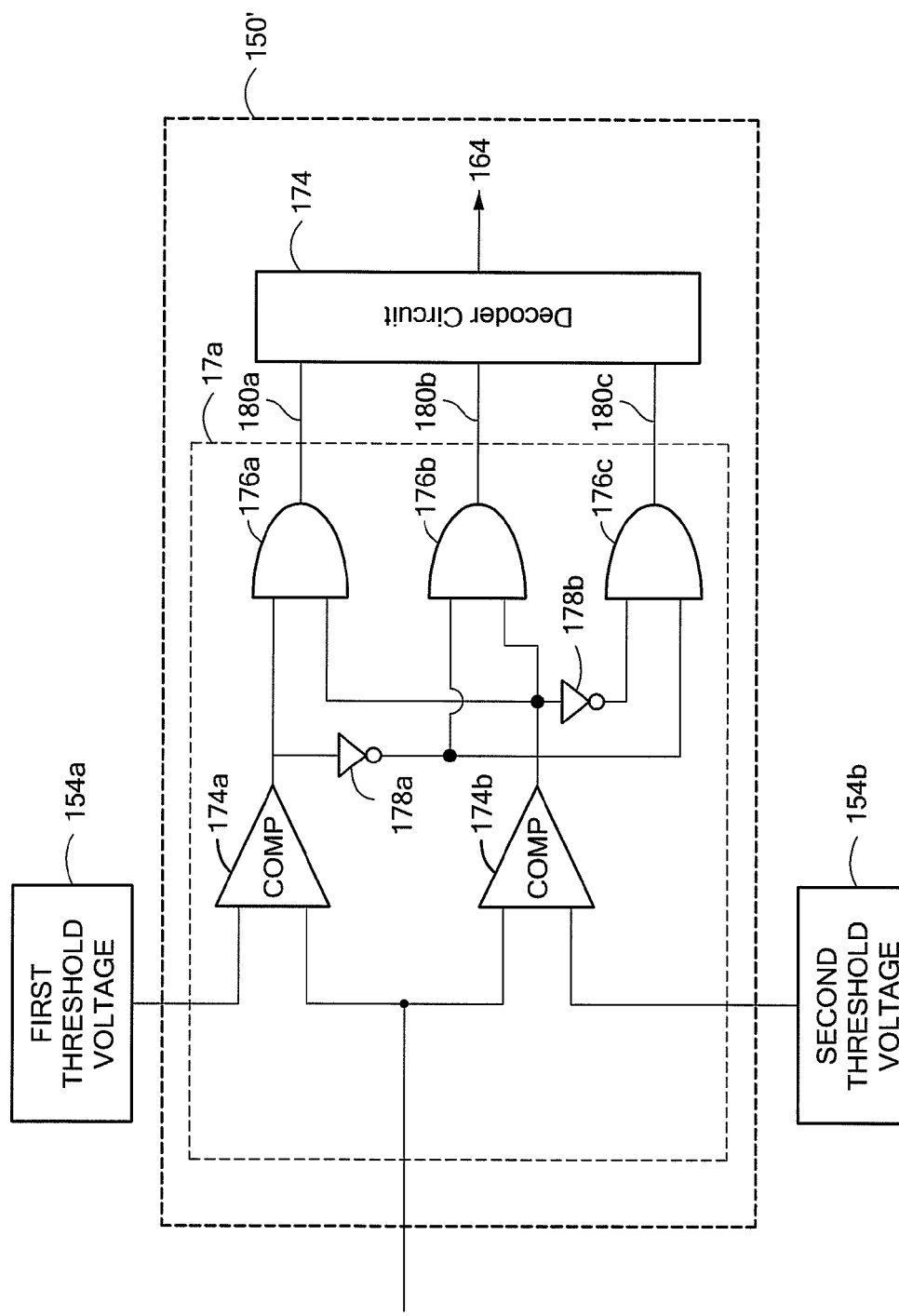
FIG. 3B is a circuit diagram of a duty cycle logic circuit of the PWM sequencer of FIG. 3A.

Referring to FIG. 3B, one example of the duty cycle control circuit 150 is a duty cycle control circuit 150'. The duty cycle control circuit 150' is used for three different voltage levels receive at PDC 20. The duty cycle control circuit 150' includes a window comparator 172 and a decoder circuit 174.

The window comparator 172 includes a comparator 174a connected to a first threshold voltage 154a and the PDC port 20 via the connection 92 and a comparator 174b connected to a second threshold voltage 154b and the PDC port 20 via the connection 92. The output of comparator 174a is connected to an AND gate 176a and, via an inverter 178a, to an AND gate 176b and an AND gate 176c. The output of comparator 174b is connected to the AND gate 176a and the AND gate 176b and, via the inverter 178b, to the AND gate 176c. Outputs 180-180c of each of the AND gates 176a-176c are provided to the decoder circuit 174 which provides the corresponding duty cycle control signal 164 to the PWM oscillator 160 based on the outputs 180-180c.

In one example, if the voltage level provided at PDC 20 has a higher voltage level than the first and second threshold voltages 154a, 154b, then the output signal 180a will be at one logic state while the other output signals, 180b, 180c have the opposite logic state. If the voltage level provided at PDC 20 has voltage level between the first and second threshold voltages 154a, 154b, then the output signal 180b will be at one logic state while the other output signals, 180a, 180c have the opposite logic state. If the voltage level provided at PDC 20 has a voltage level below the first and second threshold voltages 154a, 154b, then output signal 180c will be at one logic state while the other output signals, 180a, 180b have the opposite logic state. In one example of the duty cycle logic control circuit 150', the first reference voltage 174a is about 2 volts and the second voltage reference voltage is about 1 volt. In other examples, the first and second threshold voltages 154a, 154b may be fixed voltage references or ratiometric voltage references (i.e., the voltage references scale up and down with increasing or decreasing supply voltages, respectively).

In another example, the value of the voltage provided at the PDC port 20 is detected by the window comparator 172 within the duty cycle logic circuit 150 to detect if the value is ground, the supply voltage, or a floating voltage. If the user does not connect the PDC port 20 to ground or to the supply voltage then the motor controller 10 internally includes a voltage divider (not shown) that will set the value to one-half the supply voltage. The value of the voltage provided at the PDC port 20 is then decoded by the duty cycle logic circuit 150.

Referring back to FIG. 3A, the enable circuit 162, upon receipt of the enable signal 146, provides the PWM output signal 82 based on the PWM oscillator output signal 166. In one example, the PWM enable circuit 162 includes a switch (not shown) so that the PWM oscillator output signal 166 is provided as the PWM output signal 82 when the switch is closed by the enable signal 146. In another example, the PWM enable circuit 162 includes an amplifier (not shown) so that the PWM output signal 82 is an amplified form of the PWM oscillator output signal 166.

Figure 4:
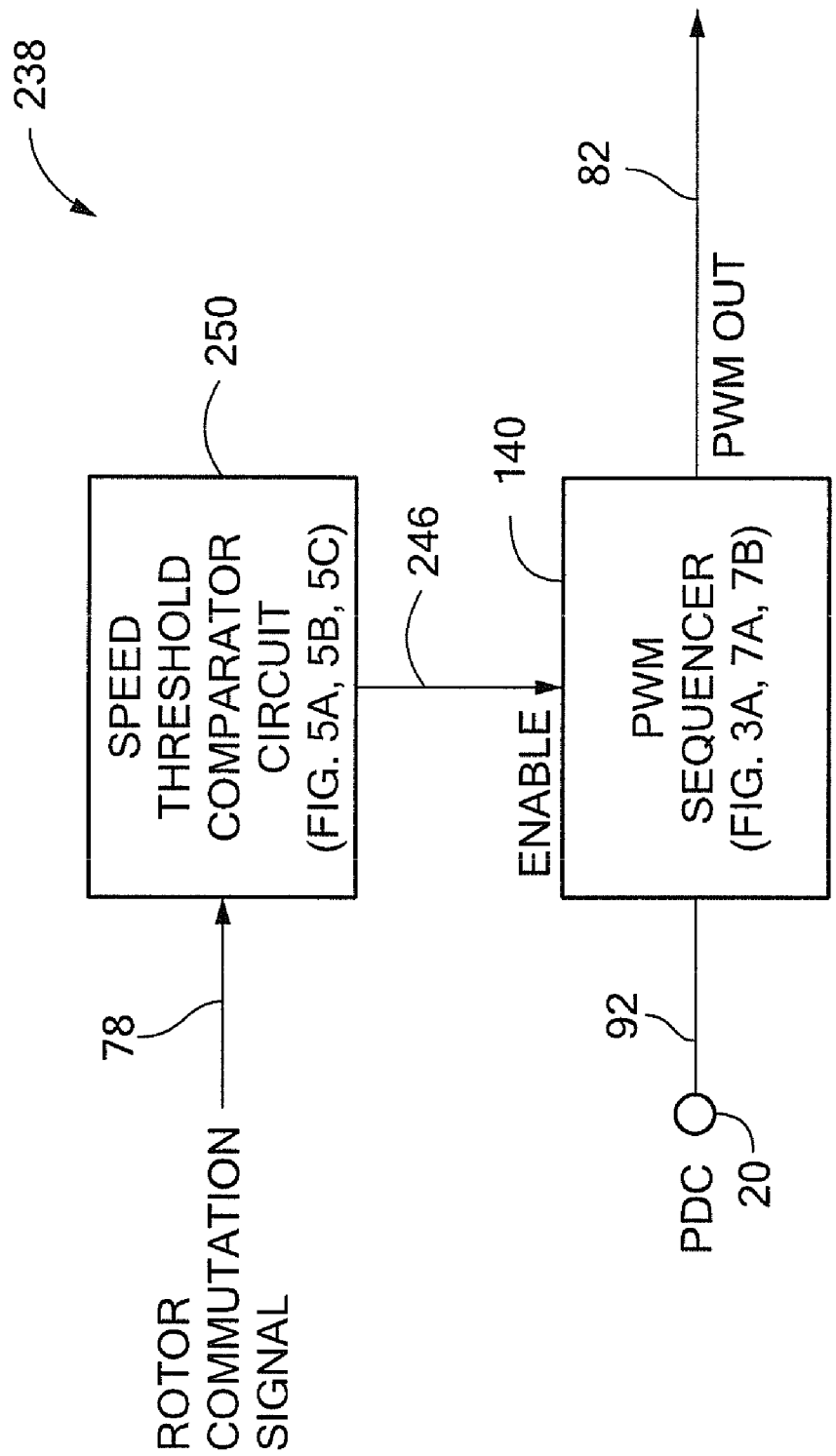
FIG. 4 is circuit diagram of another example of the PWM control circuit of FIG. 1A including a speed-threshold comparator circuit.

Referring to FIG. 4, another example of the PWM control circuit 38 is a PWM control circuit 238 that includes a speed threshold comparator circuit 250 that determines the speed of the motor 100 based on the rotor commutation signal 78. For example, the speed threshold comparator circuit 250 determines whether or not a speed threshold has been met by the motor 100 and sends the enable signal to the PWM sequencer 140 through a connection 246 in response to the speed threshold being met. When enabled, the PWM sequencer 140 provides the PWM output signal 82 with a duty cycle corresponding to the input control signal provided at the PDC 20 port.

Referring to FIG. 5A, an example of the speed threshold comparator circuit 250 is a speed threshold comparator circuit 250'. The speed threshold comparator circuit 250' includes a counter 312 coupled to the rotor commutation signal 78 (e.g., in the form of a pulse train) and a clock reference 342; a digital comparator 322 coupled to the counter 312; and a preset threshold register 332 coupled to the digital comparator 322. The counter receives pulses from the rotor commutation signal during a predetermined time period equal to a time duration of a clock pulse from the clock reference 342. Each pulse from the rotor commutation signal 78 received within the predetermined time period is counted and a value is assigned to the total number of pulses received in the counter 312. After the predetermined time period, the counter 312 is reset. The digital comparator 322 compares the count value provided by the counter 312 with a preset threshold value. If the value stored in the counter 312 is greater than or equal to the preset threshold value in the preset threshold register 332, then the digital comparator 332 provides the enable signal 246 (e.g., for example, a logic high voltage level) to the PWM sequencer 140 (FIG. 4). In one example, the enable signal 246 is latched so that once in the PWM mode, there is no reversing of the enable signal until the motor controller 10 goes to sleep or is turned off and then turned on again.

Figure 5B:
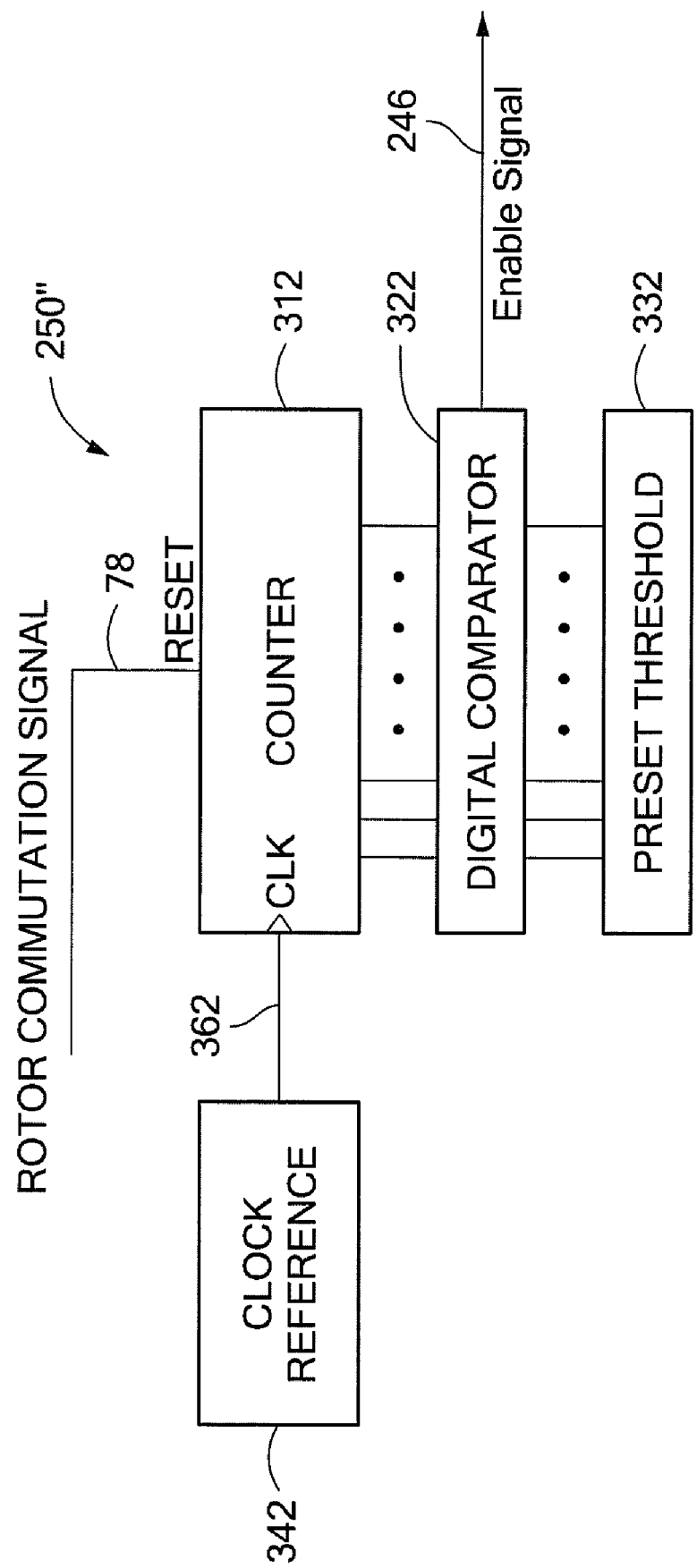

Referring to FIG. 5B, another example of the speed threshold comparator circuit 250 is a speed threshold comparator circuit 250" where the components in FIG. 5B are arranged differently than FIG. 5A. The speed threshold comparator circuit 250" includes the counter 312 coupled to receive clock pulses from the clock reference 342 through the connection 362; the digital comparator 322 coupled to the counter 312; and the preset threshold register 332 coupled to the digital comparator 322 coupled to an output of the digital comparator 322. The counter 312 stores a value corresponding to a count of clock pulses received while the commutation signal 78 is a particular logic state, here a logic high state for example. The counter 312 is reset when the rotor commutation signal transitions to an alternative logic state, here a low logic state, for example. The digital comparator 322 compares the count value provided by the counter 312 with the preset threshold value stored in the preset threshold register 332. If the value stored in the counter 312 is less than the preset threshold value in the preset threshold register 332, then the digital comparator 322 provides the enable signal 246 as a logic high voltage value, for example. For example, the rotor commutation signal 78 is resetting the counter 312 so that if the motor 100 is spinning slowly, the counter will always reach a high value, and only when the speed of the motor 100 is high will the counter 312 not reach the preset threshold value, as the reset pulses will be coming faster.

Figure 5C:
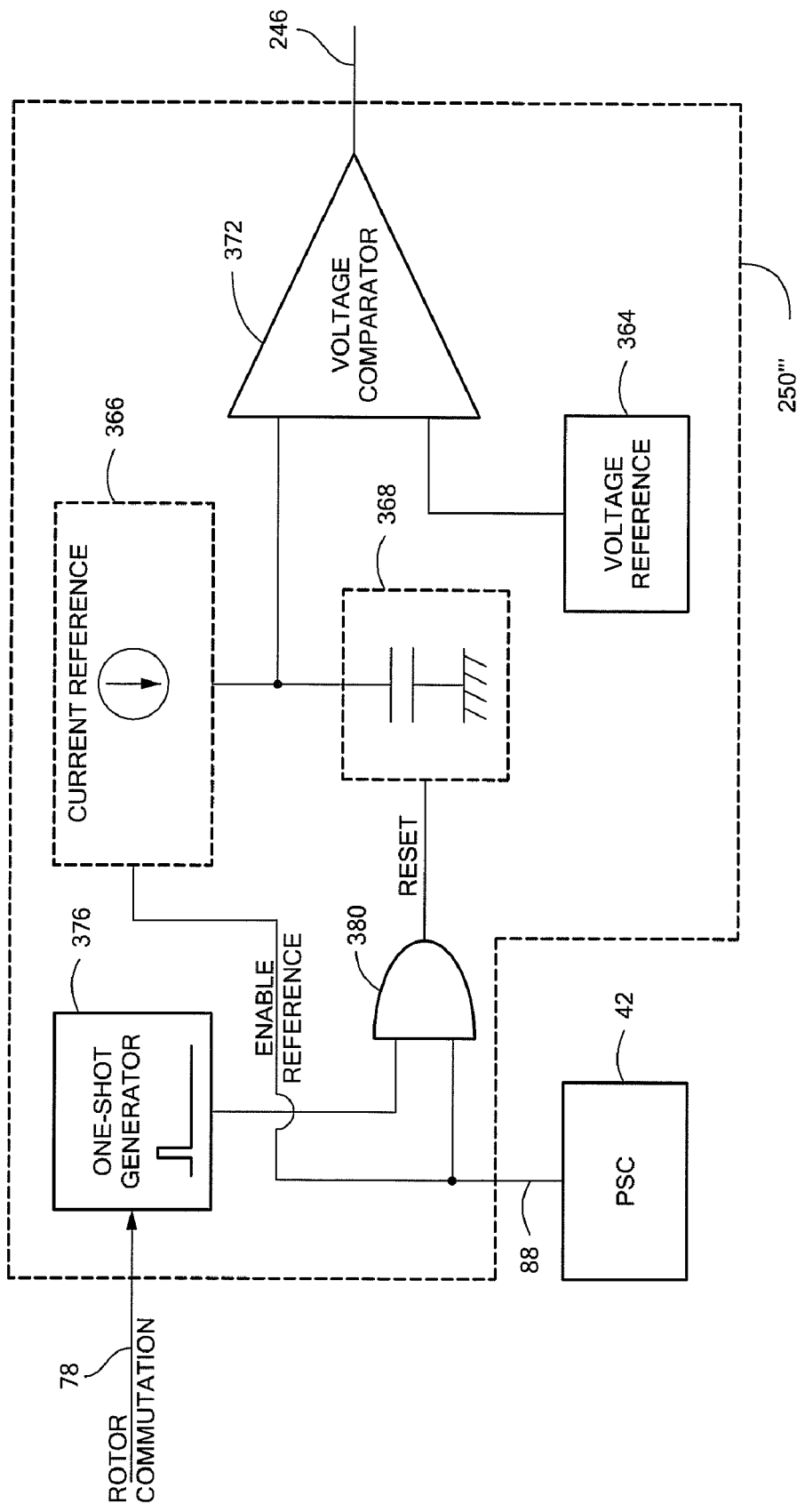

Referring to FIG. 5C, a further example of the speed threshold comparator circuit 250 is a speed threshold comparator circuit 250'''. The speed threshold comparator circuit 250''' includes a voltage comparator 372 and an AND gate 380. The voltage comparator 372 is connected to a fixed voltage reference 364 at one input and a current reference source 366 and a capacitor 368 at another input. The AND gate 380 has an output connected to the capacitor 368 and one input connected to a one-shot generator 376 and a second input connected to the PSC 42 (FIG. 1A) by a connection 88. The voltage comparator 372 compares the voltage across the capacitor 368 with the fixed voltage reference 364.

The current reference source 366, connected to PSC 42, is configured to be activated in response to the activation signal 88. When activated by the PSC 42, the current reference source 366 charges the capacitor 368 to increase the voltage across the capacitor linearly over time. In one example, when the voltage across the capacitor 368 is lower than the fixed voltage reference (as occurs when the motor speed is high), the enable signal 246 transitions to a logic high level (see, for example, an enable signal 408 in FIG. 6) to cause the PWM sequencer 140 (FIG. 4) to provide the PWM output signal 82; whereas when the voltage across the capacitor 368 is greater than the fixed voltage reference (as occurs when the motor speed is low), the enable signal 246 is at a logic low level to cause the PWM sequencer 140 (FIG. 4) not to provide the PWM output signal 82.

The voltage across the capacitor 368 increases until it is reset. The one-shot generator 376 provides a pulse signal to the AND gate 380 at each edge of the rotor commutation signal 78 having a pulse train. The PSC 42 also provides the activation signal 88 to the AND gate 380. When the activation signal 88 and the pulse signal from the one-shot generator 376 are at a logic high voltage level, for example, the AND gate 380 provides a reset signal to the capacitor 368 to discharge the capacitor 360.

In other examples, the speed threshold comparator 250 may not be based on a single detection from the rotor commutation signal 78 of a particular speed. For example, the circuitry in FIG. 5C may be configured to detect more than one occurrence of a particular speed being achieved before engaging the PWM signal to account for non-uniformities from the magnetic signal emanating from the motor 100. For example, the capacitor voltage is measured to be greater than the voltage reference 364 at least four different occasions before the enable signal 246 indicates the motor 100 has achieved a particular speed.

Figure 6:
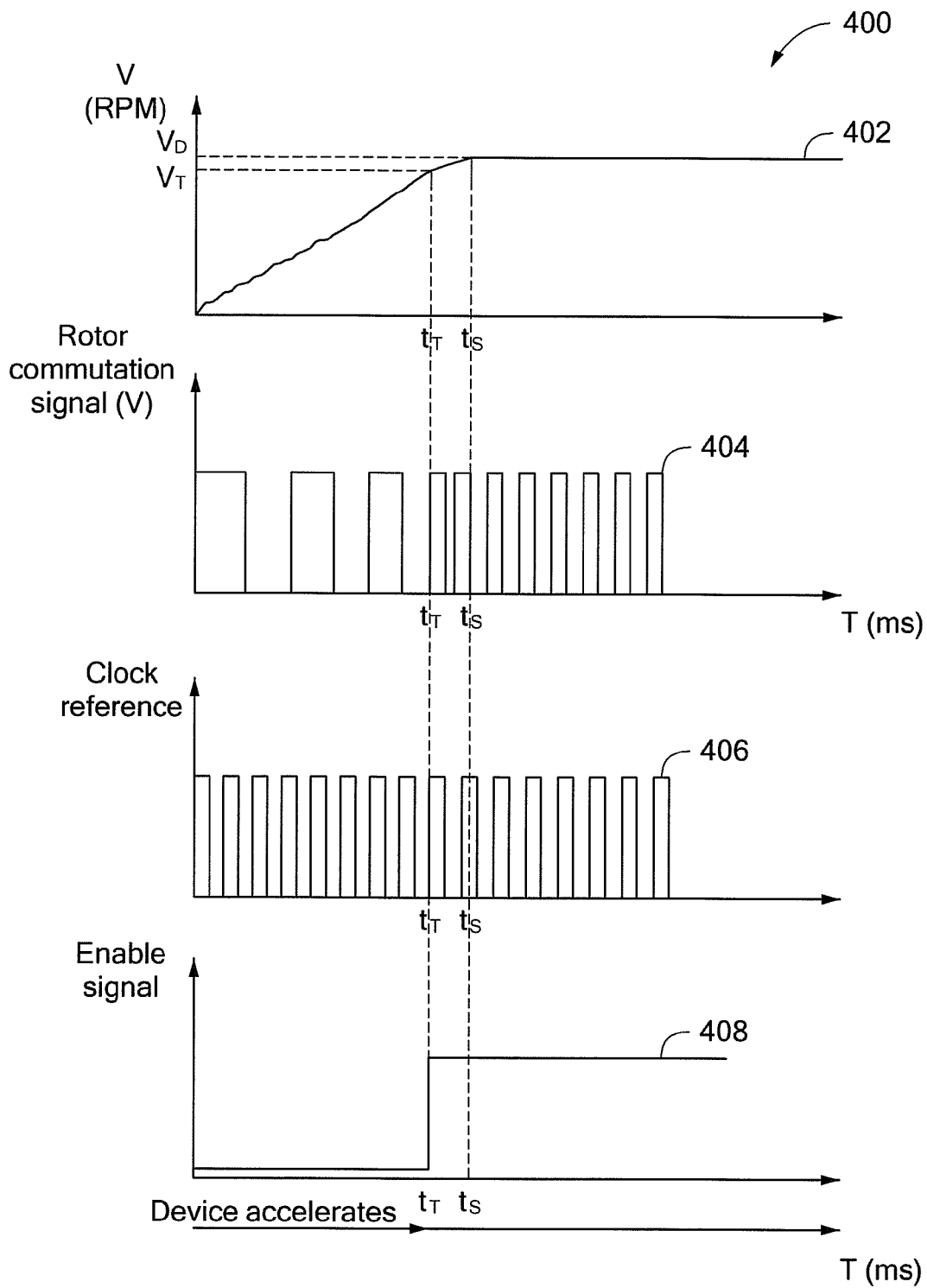
FIG. 6 is a timing diagram showing several illustrative waveforms associated with the motor controller of FIG. 1A.

FIG. 6 is a timing diagram 400 showing various illustrative waveforms associated with the motor controller 10 (FIG. 1A). FIG. 6 includes a motor speed curve 402 (e.g., velocity-over-time), a rotor commutation signal 404 (as may be provided at the output of amplifier 56 in FIG. 1A), a clock reference signal 406 (as may be provided by the clock reference 342 in FIGS. 5A and 5B) and an enable signal 408 (as may be provided by the enable signal 146 at the output of the timer 144 of FIG. 2 or by the enable signal 246 at the output of the speed threshold comparator circuit 250 of FIG. 4, for example).

During start up of the motor 100, the velocity in the motor speed curve 402 increases as the 100% duty cycle is applied to the motor 100 (e.g., as shown in FIG. 1B or 1C). Once a predetermined motor speed is detected, the PWM control circuit 38 causes the duty cycle of the motor control signals 84 to be reduced. As shown in FIGS. 2 and 4, determining the speed of the motor may be achieved by measuring time or measuring the speed of the motor 100, respectively. For example, using the PWM control circuit 138 (FIG. 2), the motor is determined to have achieved a predetermined speed after a predetermined time has lapsed following power being applied to the motor controller 10 (as long as a sleep signal is not enabled at the port 16). At time, $t_T$, the enable signal is sent from the timer 144 to the PWM sequencer 140 which in turn provides the PWM output signal 82 to set the duty cycle signal of the motor control signals 84 to correspond to the input control signal received at the PDC port 20.

Figure 7A:
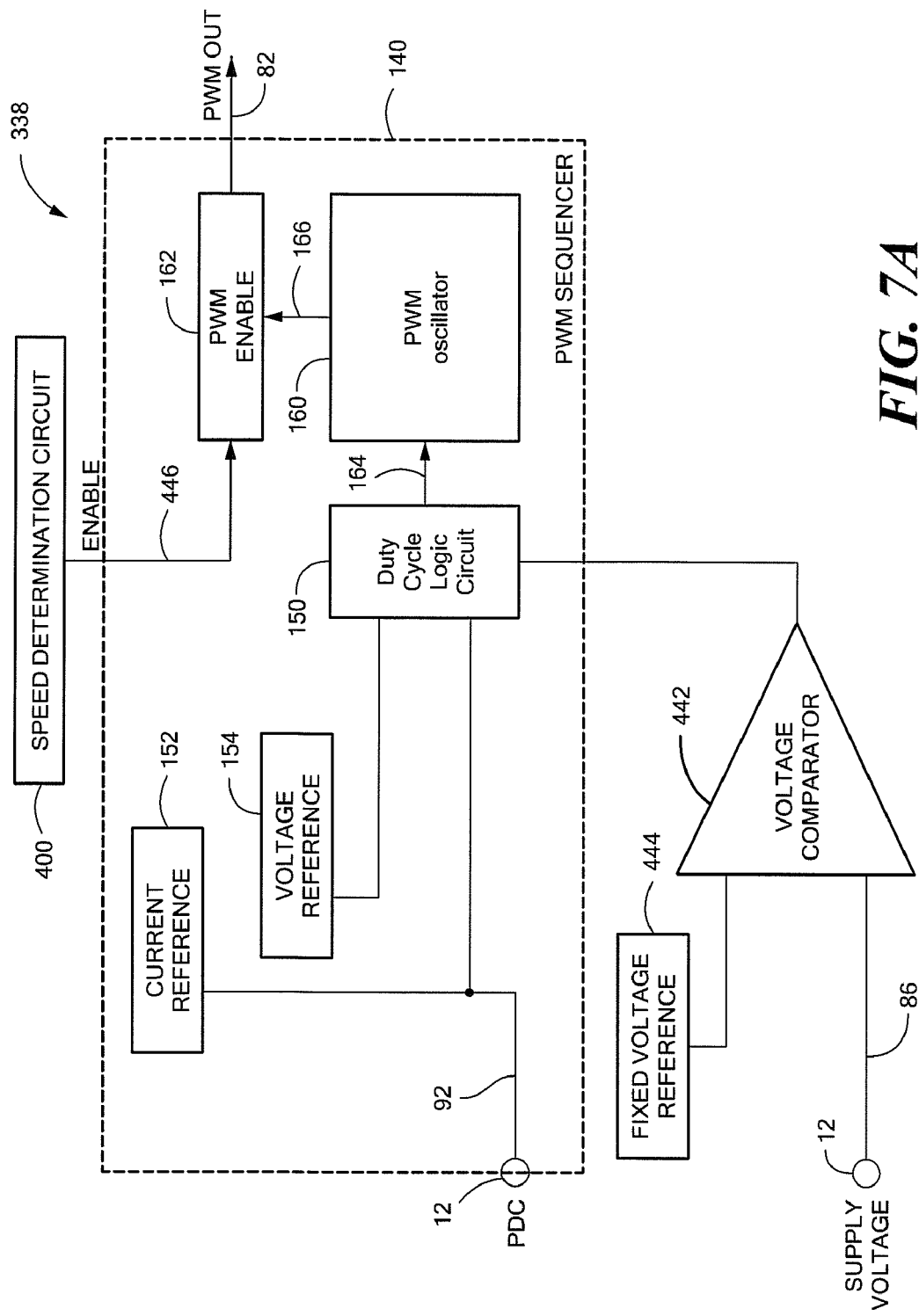
FIG. 7A is circuit diagram of a further example of the PWM control circuit of FIG. 1A.

In another example, using the PWM control circuit 238 (FIG. 4), the motor 100 is determined to have achieved a threshold speed by the speed threshold comparator circuit 250 (e.g., counting a number of rotor commutation pulses corresponding to the preset threshold value stored in the preset register 332 of FIG. 5A). For illustrative purposes, the threshold speed corresponds to the motor speed signal 402 reaching a threshold velocity $V_T$. When the motor speed signal 402 reaches the threshold velocity $V_T$, the enable signal 246 is sent from the speed threshold comparator circuit 250 to the PWM sequencer 140 which in turn provides the PWM output signal 82 to set the duty cycle of the motor control signals 84 to correspond to the input control signal received at the PDC port 20. When the duty cycle signal is reduced from 100% duty cycle to the selected duty cycle, the velocity of the motor increases until it reaches the corresponding speed (here corresponding to a velocity $V_D$) for the selected duty cycle, here occurring at a time $t_s$. Referring to FIG. 7A, another example of the PWM control circuit 38 is a PWM control circuit 338 used to maintain the speed of the motor 100 substantially constant when variations in the supply voltage occur. The PWM control circuit 338 includes a speed determination circuit 400 and the PWM sequencer 140 (FIG. 3) connected to the speed determination circuit 400 through a connection 446.

In one example, the speed determination circuit 400 includes the timer 144 (FIG. 2). In another example, the speed determination circuit 400 includes the speed threshold comparator 250 (FIG. 4).

The PWM control circuit 338 also includes a comparator 442 configured to compare a fixed voltage reference 444 with the supply voltage provided from the supply voltage port 12 through the connection 86. The duty cycle logic circuit 150, as described above in connection with FIG. 3, provides the duty cycle control signal 164 to the PWM oscillator 160 to set the duty cycle of the PWM output signal 82 as a function of the input signal applied to the PDC port 20 as described above. The duty cycle logic circuit 150 further adjusts the duty cycle of the PWM output signal 82 (by providing a corresponding signal to the PWM oscillator 160) in response to the signal received from the comparator 442, so that the duty cycle of the PWM output signal 82 is inversely proportional to the supply voltage. For example, if the supply voltage decreases, the duty cycle logic circuit 150 provides a higher voltage signal to the PWM oscillator 160 to increase the duty cycle so that the speed of the motor 100 is maintained at the speed selected via PDC port 20.

The enable circuit 162 receives an enable signal 446. In one example, the enable signal 446 is provided in the form of a signal 146 from the timer 144 (FIG. 2). In another example, the enable signal 446 is provided in the form of signal 246 from the speed threshold comparator circuit 250 (FIG. 4).

Figure 7B:
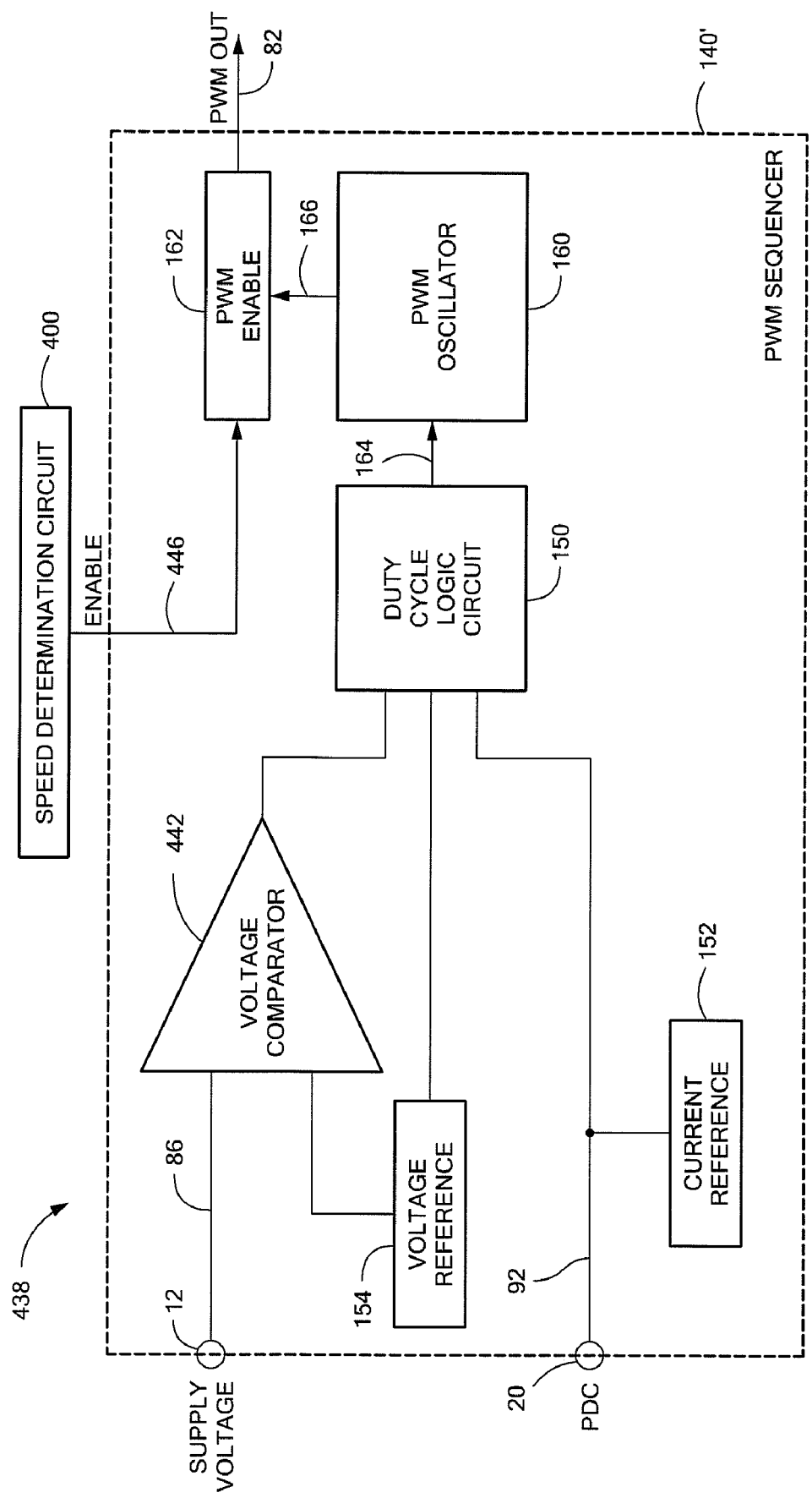
FIG. 7B is circuit diagram of another example of the PWM control circuit of FIG. 1A.

Referring to FIG. 7B, another example of the PWM control circuit 38 (FIG. 1A) is a PWM control circuit 438. The PWM control circuit 438 includes the speed determination circuit 400 and a PWM sequencer 140'. The PWM sequencer 140' is substantially the similar to the PWM sequencer 140 (FIG. 3)

except that the PWM sequencer 140' includes the voltage comparator 442 (FIG. 7A) and is responsive to the supply voltage level. The voltage comparator 442 compares the supply voltage to the voltage reference 154 (FIG. 3) which is also used by the duty cycle logic circuit 150 for comparison to the voltage at the PDC port 20 as described above in connection with FIG. 3.

Using the circuits of FIG. 7A or 7B, the speed of the motor 100 is controlled within a tight speed regulation band over temperature variations and motor applications. The inverse proportionality of duty cycle to the supply voltage results in tighter speed control because the speed of the motor 100 is, to the first order, related to the current passing through the motor coil. For example, to pass current through a motor coil, two of the four transistors Q1, Q2, Q3, Q4 in the H-bridge 64 must be on. When two transistors are in series, the resistance is about 4 ohms total. Additionally, the motor coil might have a resistance of 26 ohms. So the total resistance of the motor coil and the two transistors in series is 30 ohms. Therefore, at a supply voltage of 3 volts, a 100 mA current flows through the motor coil. At a supply voltage of 4 volts, approximately 133 mA of current flows through the motor coil and, for a fixed duty cycle, the speed of the motor will be 33% higher for a supply voltage equal to 4 volts compared to a supply voltage equal to 3 volts.

The duty cycle is varied to regulate the duty cycle as a function of the supply voltage. For example, at a supply voltage of 3 volts if a duty cycle of 80% is chosen, then at a supply voltage of 4 volts, the duty cycle would be adjusted to (3 volts/4 volts)*80% duty cycle or 60% duty cycle and therefore the motor speed would stay constant as the supply voltage varies.

Figure 8:
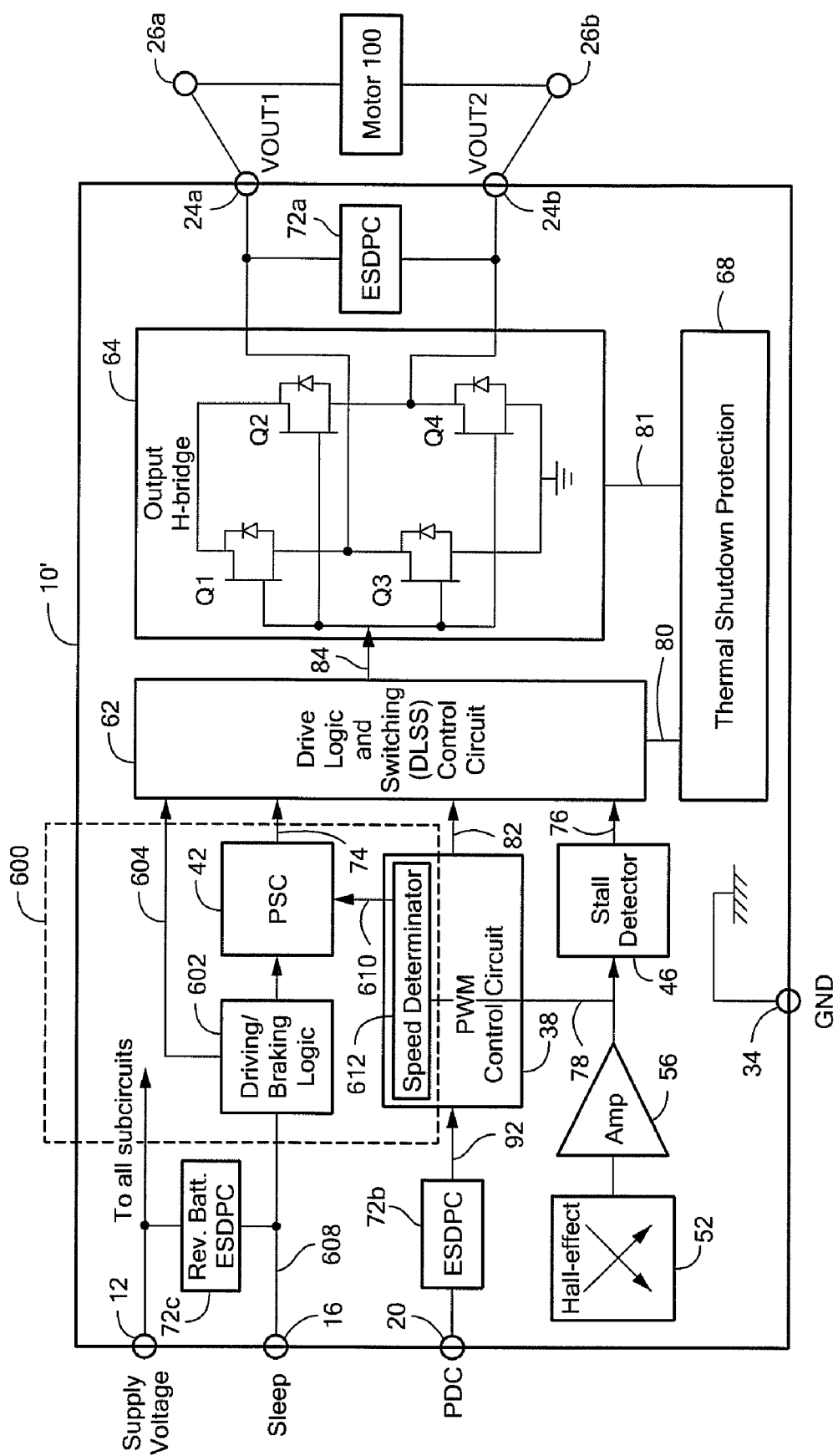
FIG. 8 is a circuit diagram of an alternative embodiment of the motor controller of FIG. 1A including a motor braking subcircuit according to an aspect of the invention.

Referring to FIG. 8, one example of the motor controller 10 is a motor controller 10' including a subcircuit 600 used during braking of the motor 100. The subcircuit 600 includes a driving/braking logic circuit 602, the PSC circuit 42 and a speed determination circuit 612 within the PWM control circuit 38. The driving/braking logic circuit 602 is coupled to the DLSS control circuit 62 through a connection 604 and to the PSC circuit 42 through a connection 606. The speed determination circuit 612 is coupled to the PSC circuit 42 through a connection 610.

In operation, the driving/braking logic circuit 602 receives a sleep signal from the sleep port 16 through a connection 608. When the sleep mode is enabled, the driving/braking logic circuit 602 sends a motor direction change signal through the connection 604 to the DLSS control circuit 62 to reverse the motor direction (by inverting the pairs of transistors that are on when in the presence of a north or south magnetic pole). The driving/braking logic circuit 602 sends a braking signal to the PSC circuit 42 through the connection 606.

The speed determination circuit 612 receives the rotor commutation signal through the connection 78 and determines if the motor 100 is slowing down. In one example, the speed threshold comparator circuit 250" in FIG. 5B may be used to detect a slowing down of the motor 100, instead of speeding up. When the speed determination circuit 612 determines that the speed of the motor achieves a predetermined speed threshold, a brake enable signal is sent through a connection 610 to the PSC circuit 42. Upon receipt of both the brake enable signal 610 and the braking signal 606, the PSC circuit 42 sends the sleep control signal 74 to the DLSS control circuit 62 to cause the motor controller 10' to go into a sleep mode (i.e., to cause the transistors Q1, Q2, Q3, Q4 to cease conduction and to disable most other circuitry in the motor controller 10'). The receipt of the braking signal 606 by the PSC circuit 42 is an added safeguard that braking is occurring as planned and not due to motor stalling, for example. In other embodiments, connection 606 may be eliminated so that the sleep mode is initiated solely based on the speed determination circuit 612 detecting that the predetermined speed threshold has occurred. In still further embodiments, upon receipt of a sleep signal from port 16 through connection 608, the sleep mode may be entered directly, without braking or reversing polarity.

Figure 10:
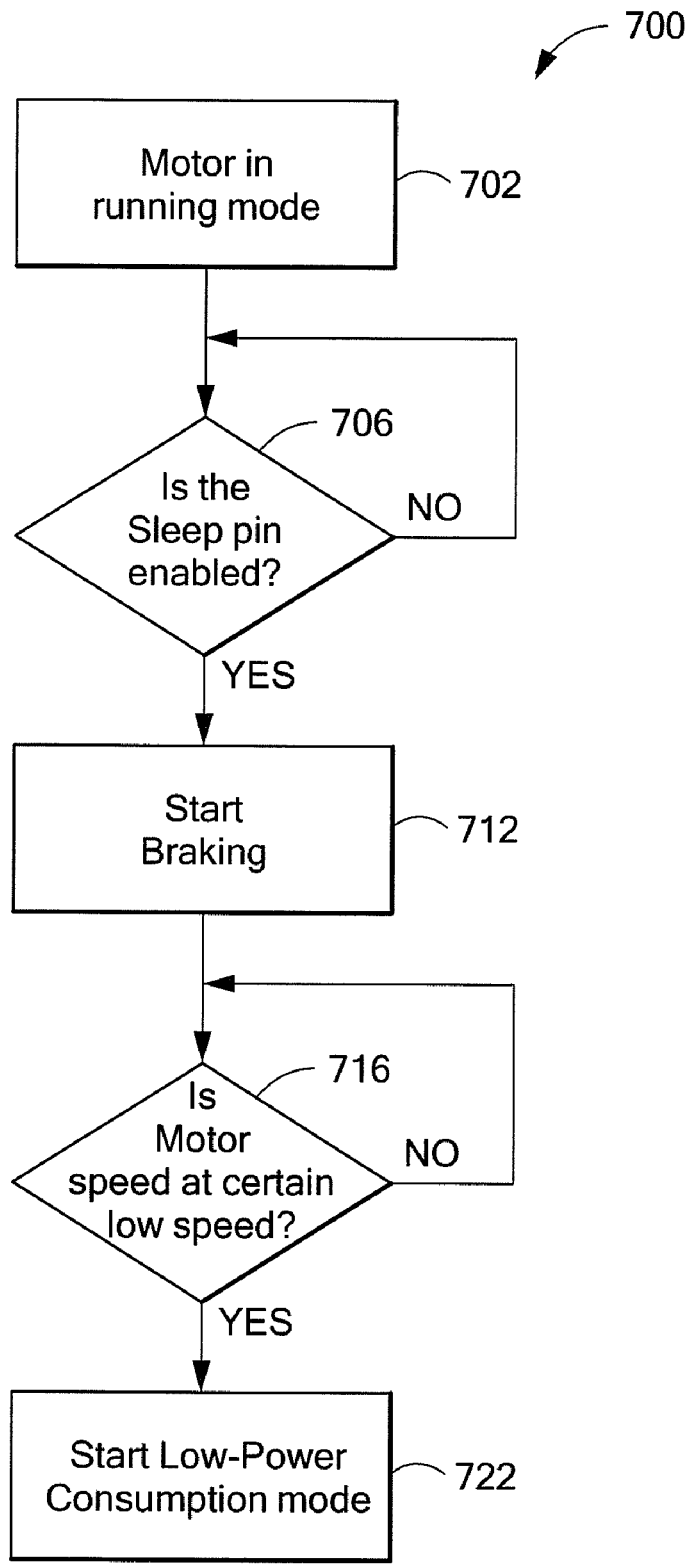
FIG. 10 is a flowchart of a process to brake the motor.

Referring to FIG. 10, an example of a process 700 to brake the motor 100 using the motor controller 10' (FIG. 8) is illustrated. In process 700, the motor 100 remains in a running mode (i.e., running at the predetermined speed established the input control signal applied at the PDC port 20) (702) until the sleep port 12 is enabled. In one example, the sleep port is enabled if it receives a low voltage signal. If it is determined that the sleep port is enabled (706), braking is commenced (712). For example, the braking signal 606 is sent from the driving/braking logic circuit 602 to the PSC circuit 42 and the motor direction change signal 604 is sent to the DLSS control circuit 62 to reverse the rotational direction of the motor 100. If it is determined that the speed of the motor 100 is at a certain speed (716), a low power consumption mode is commenced (722). For example, the speed determination circuit 602 sends the brake enable signal 610 to the PSC circuit 42. The PSC circuit 42, upon receipt of both the brake enable signal 610 and the braking signal 606, sends the sleep control signal 74 to the DLSS control circuit 62 to turn off the transistors, Q3, Q3, Q4 in the H-Bridge circuit 64 and to disable most other circuitry in the motor controller 10'''.

Figure 9:
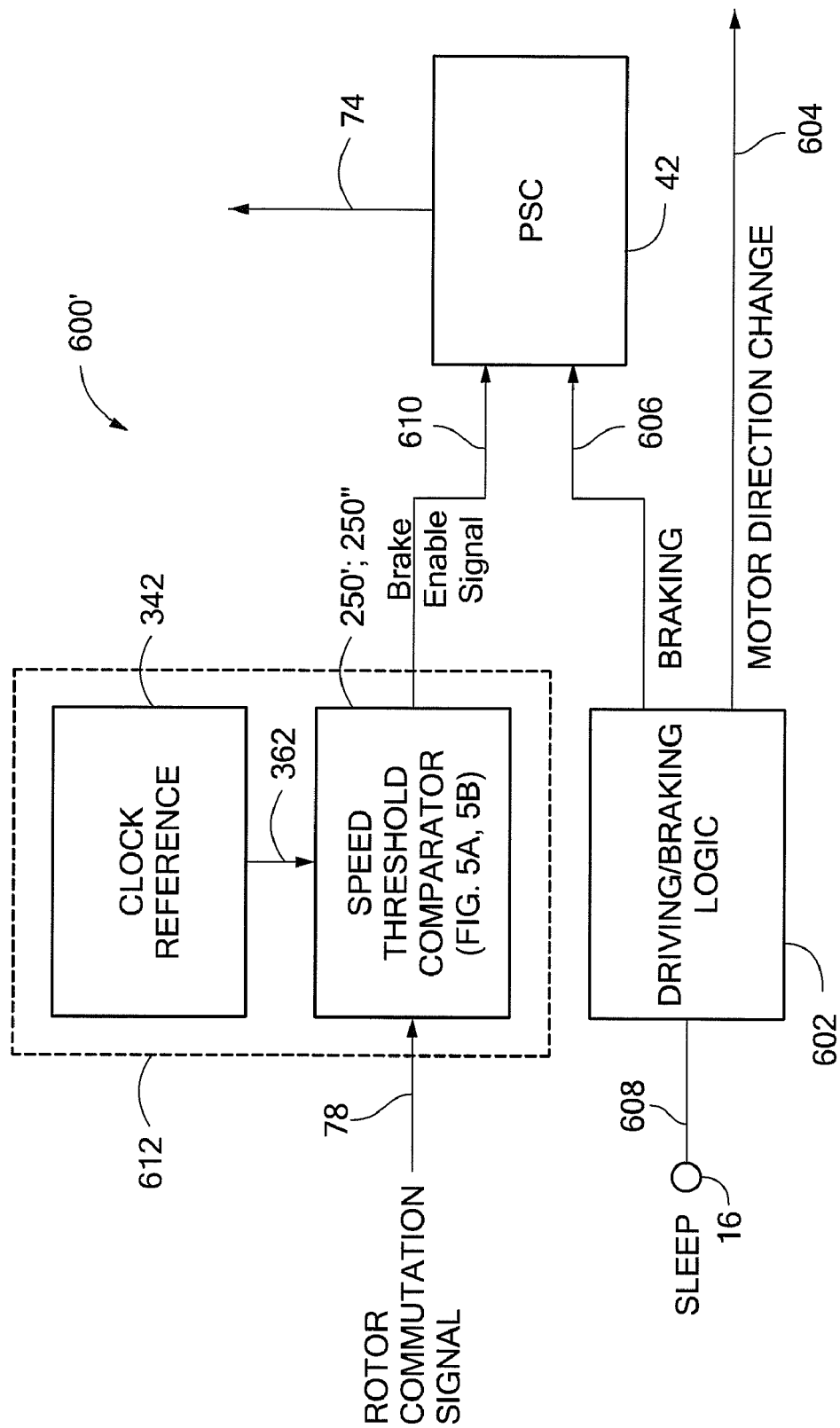
FIG. 9 is a circuit subdiagram of the circuit diagram of FIG. 8 used in the braking of the motor.
Figure 11:
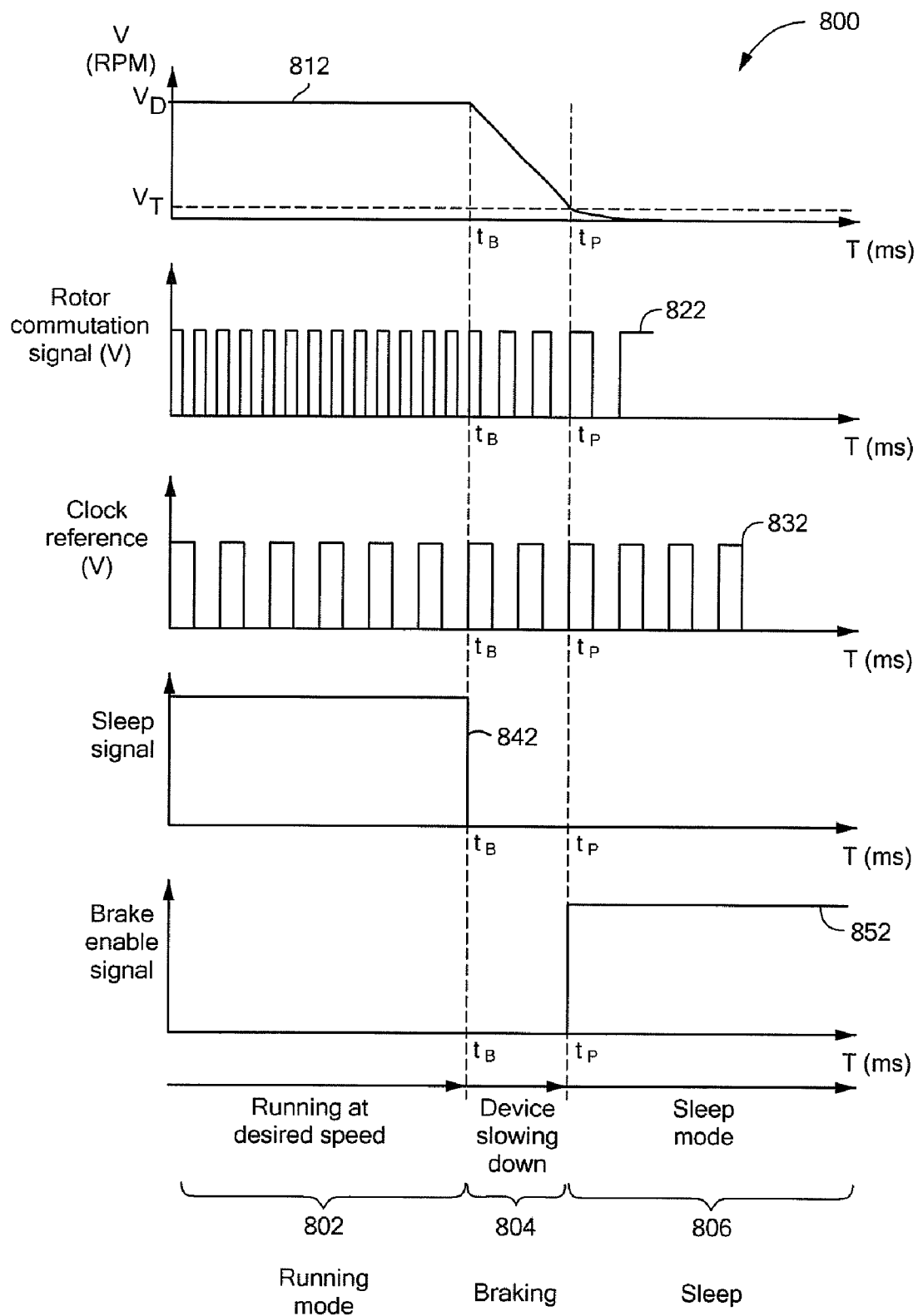
FIG. 11 is a timing diagram showing several illustrative waveforms associated with the motor controller of FIG. 8 during three phases of operation.

FIG. 11 is a timing diagram 800 showing various waveforms associated with the motor controller 10' of FIG. 8 over three phases of operation: a running mode phase 802, the braking phase 804 and the sleep mode phase 806. FIG. 11 includes a motor speed curve 812 (e.g., a velocity-over-time curve), a rotor commutation signal 822 (as may be provided at the output of amplifier 56 in FIG. 8), a clock reference signal 832 (as may be provided at the output of clock reference 342 in FIG. 9), a sleep signal 842 (as may be provided at sleep port 16) and a brake enable signal 852 (as may be provided at the output of speed threshold comparator 250', 250" in FIG. 9).

During the running mode phase 802, the velocity of the motor 100 in the motor speed curve 812 remains at a constant velocity, $V_D$ corresponding to the motor running at a constant speed. When the sleep signal 842 goes from a high logic level to a low logic level, for example, at a time, $t_B$, the running mode phase 802 ends and the braking mode phase 804 begins. In the braking phase 804, the motor speed velocity changes from the velocity, $V_D$ to a threshold velocity, $V_T$, at a time $t_p$ at which time the brake enable signal 852 goes to a high logic level, for example, and the sleep mode phase 806 begins.

Figure 12:
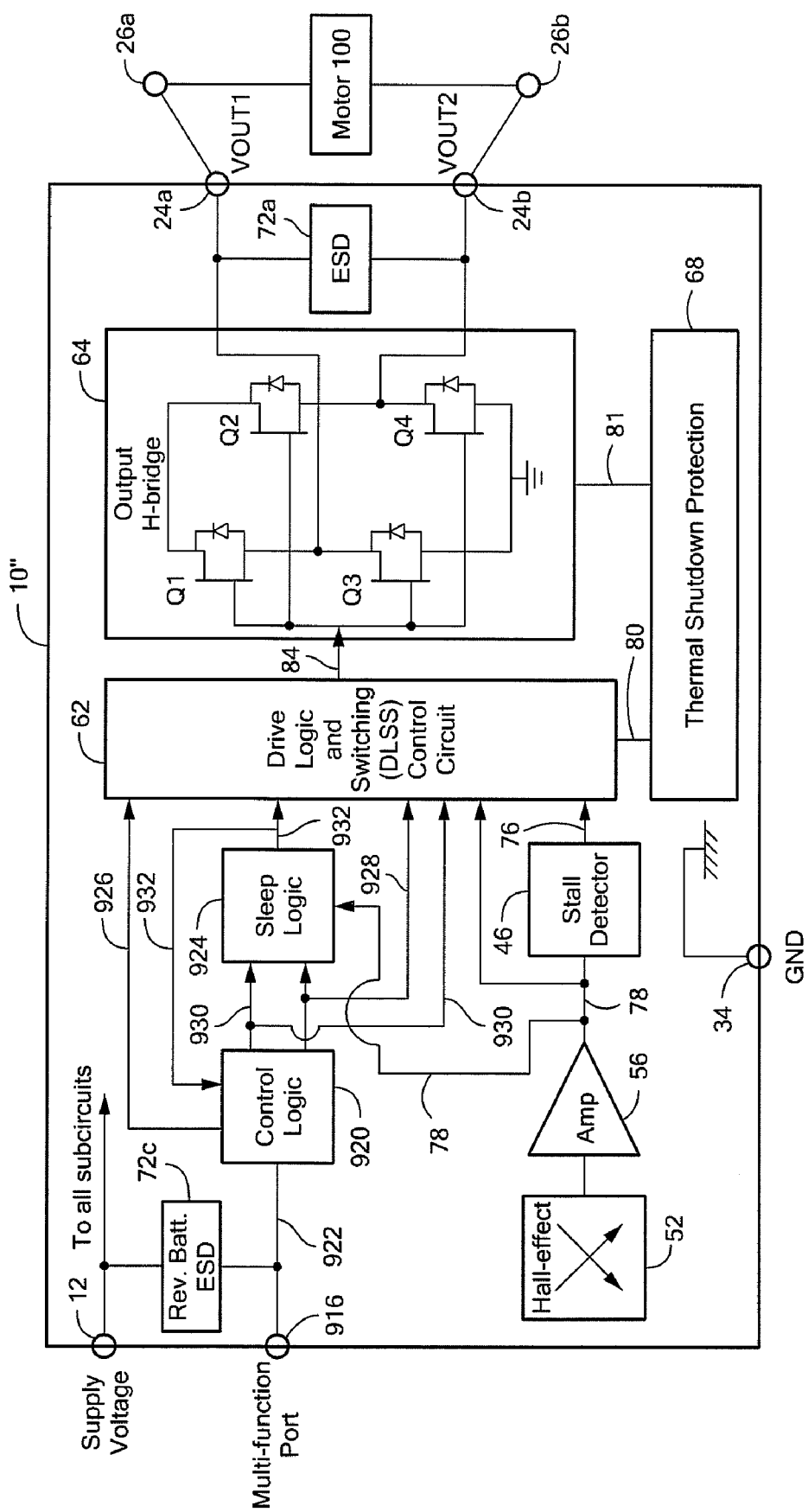
FIG. 12 is a circuit diagram of another alternative embodiment of the motor controller of FIG. 1A having a multifunction port.

Referring to FIG. 12, other embodiments of the motor controller 10 include a motor controller 10". The motor controller 10" includes a multifunction port 916 that receives a control signal (e.g., a digital signal) from an external source. In one example, the multi-functional port 916 may replace the PDC port 20 and the sleep port 16. As will be described below, the control signal provided at the multifunction port 916 may be used to perform a variety of functions including starting the motor 100, placing the motor in the PWM mode by providing the PWM signal, braking the motor or placing the transistor Q1, Q2, Q3, Q4 and other circuitry of the motor controller 10" in the sleep mode.

The motor controller 10" includes a control logic circuit 920, and a sleep logic circuit 924. The control logic circuit 920 is connected to the multifunction port 916 by a connection 922 and to the DLSS control circuit 62 by a connection

926, a connection 928 and a connection 930. The sleep logic circuit 924 is connected to the control logic circuit 920 by the connections 928, 930 and to the DLSS control circuit 62 by the connection 932.

In one example, the connection 926 provides an awake signal, the connection 928 provides a motor control signal (e.g., a PWM signal), the connection 930 provides a brake signal and the connection 932 provides a sleep signal. In one logic state, the awake signal 926 provided to the DLSS control circuit 62 turns on the motor 100 from a sleep mode. In one example, the awake signal 926 provided to the DLSS control circuit 62 starts the motor at a 100% duty cycle, for example. In one logic state, the motor control signal 928 provided to the DLSS control circuit 62 controls the motor speed and the brake signal 930 provided to the DLSS control circuit brakes the motor 100. In one logic state, the sleep signal 932 provided to the DLSS control circuit 62 places the motor controller 10''' in the sleep mode.

Figure 13:
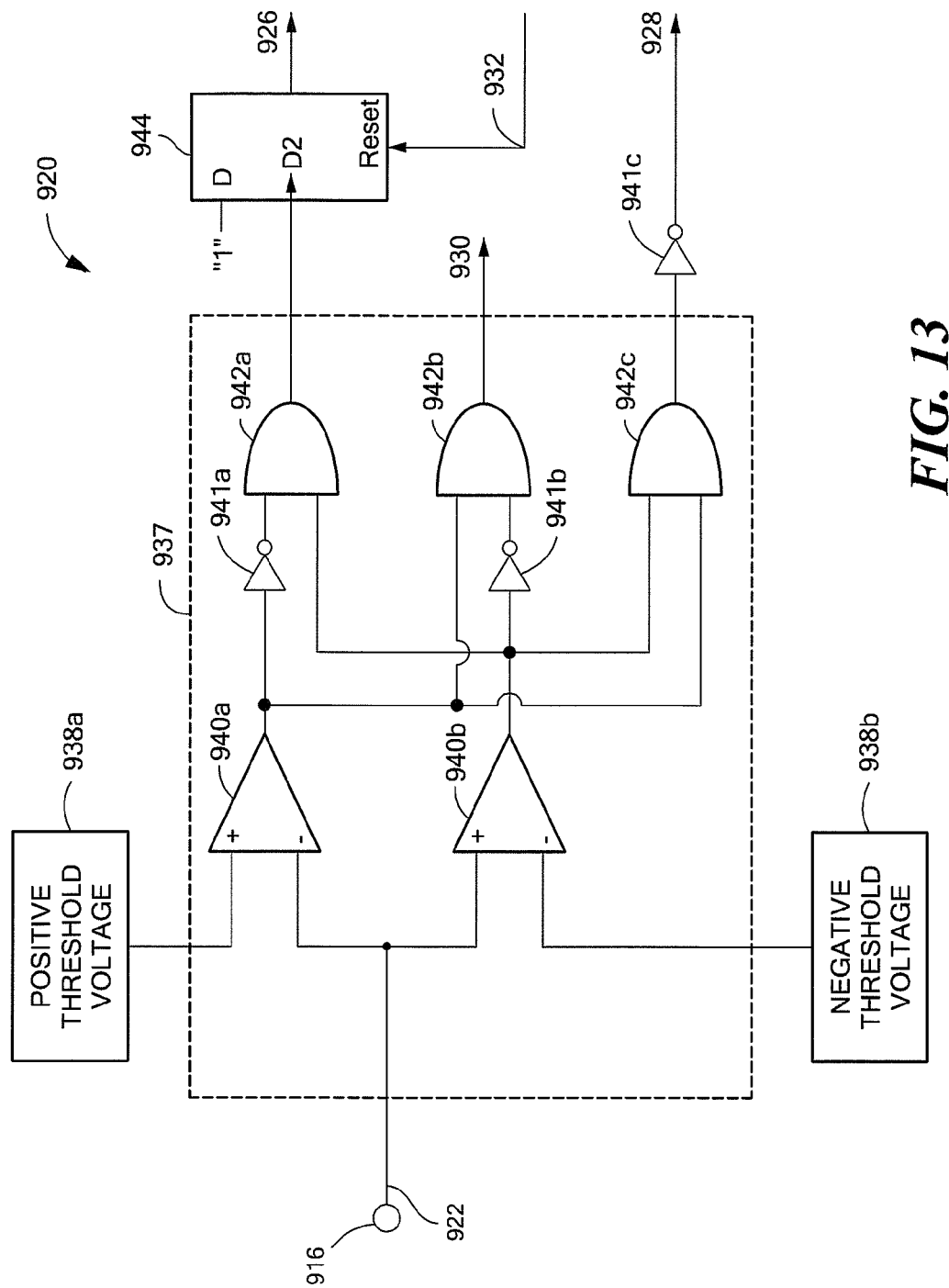
FIG. 13 is a circuit diagram of a control logic circuit of the motor controller of FIG. 12.

Referring to FIG. 13, in one example, the control logic circuit 920 includes a window comparator circuit 937, which includes a comparator 940a connected to a positive threshold voltage 938a and the multifunction port 916 via the connection 922 and a comparator 940b connected to a negative threshold voltage 938b and the multifunction port 916 via the connection 922. The output of comparator 940a is connected to an AND gate 942a', via an inverter 941a, and to an AND gate 942b and an AND gate 942c. The output of comparator 940b is connected to the AND gate 942a and to the AND gate 942c and, via the inverter 941b, to the AND gate 942b.

The output of the AND gate 942a is connected to a latch circuit 944. The output of the AND gate 942c is connected to an inverter 941c. The output of the latch circuit 944 provides the awake signal 926, the output of the inverter 941c provides the motor control signal 928 and the output of the AND gate 942b provides the brake signal 930.

In one example, from a sleep mode, the multifunction port 916 receives a signal having a voltage level greater than the positive threshold voltage 938a. Correspondingly, the output of the AND gate 942a becomes a logic high voltage level, for example, and the output from the AND logic gates 942b, 942c become a low logic voltage level, for example. The latch circuit 944 latches to a logic high voltage level, for example, and provides the awake signal 928. The output of latch circuit 944 will remain latched until reset, for example, by a logic high voltage level from the sleep signal 932.

If the control signal received at the multifunction port 916 is between the positive threshold voltage 938a and the negative threshold voltage 938b, the motor control signal 928 is at a logic high voltage level while the brake signal 930 is at a logic low voltage level, for example. The motor control signal 928 is proportional to the control signal received at the multifunction port 916 while the voltage is greater than the negative voltage threshold 938b.

If the control signal received at the multifunction port 916 is below the negative threshold voltage 938b, then the brake signal 930 is a logic high voltage level, for example. For example, if the control logic circuit 920 receives a negative logic high voltage level, the control circuit 926 sends a brake signal 930 to the sleep logic circuit 924 and to the DLSS control circuit 62 to brake the motor 100 upon receipt of the brake enable signal. DLSS control circuit 62 may brake the motor 100 using a number of techniques.

In a first technique, the DLSS control circuit 62 reverses the polarity of the H-bridge circuit 64 thereby causing the motor 100 to drive the motor 100 in the opposite direction. In one example of the first technique, the DLSS control circuit 62 provides motor control signals 84 to spin the motor 100 in a reverse direction with a 100% duty cycle. In a second technique, the DLSS control circuit 62 provides motor control signals 84 to short the coils in the motor 100 to ground thereby using a back EMF to stop the rotation of the motor 100.

Figure 14:
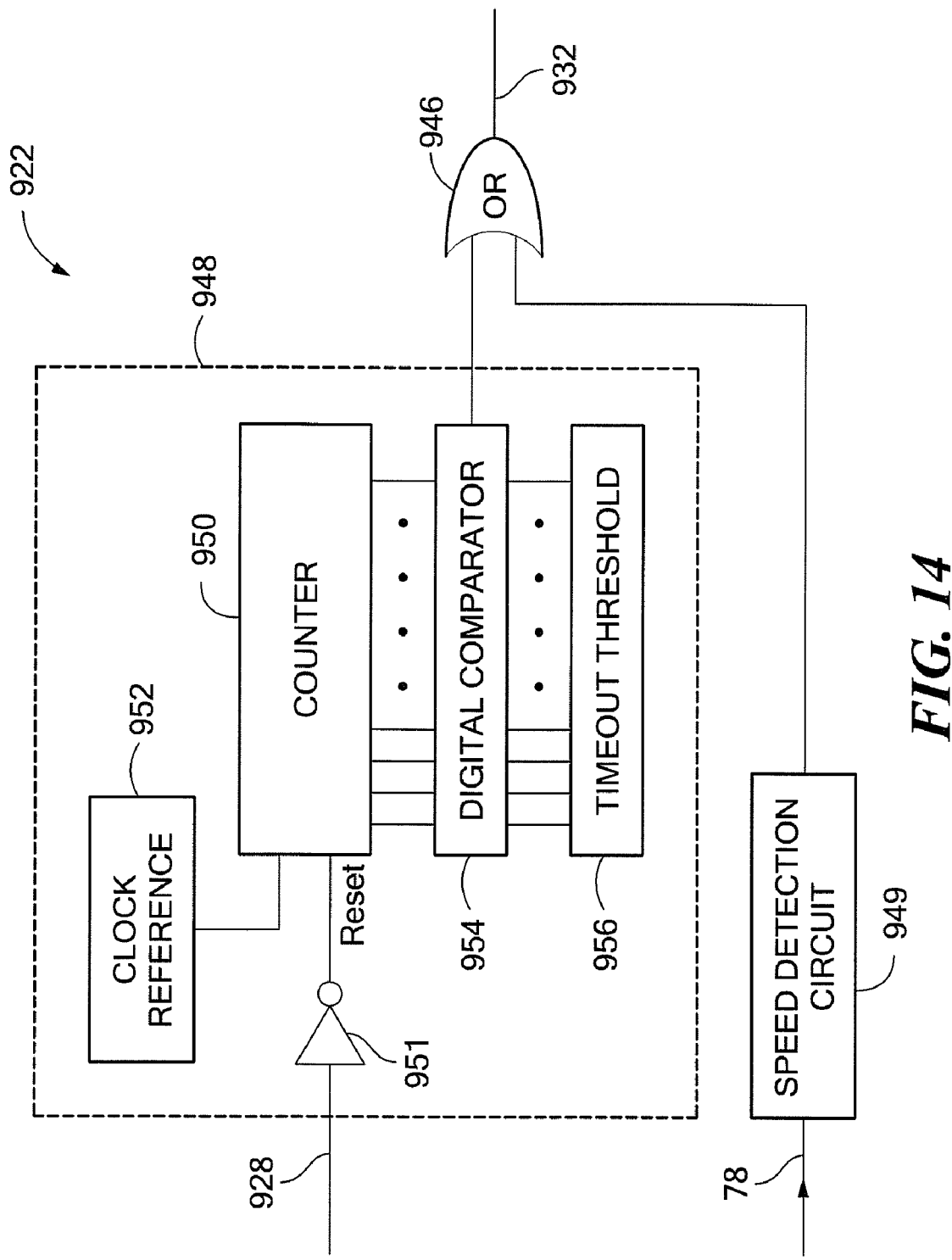
FIG. 14 is a circuit diagram of a sleep logic circuit of the motor controller of FIG. 12.

Referring to FIG. 14, in one example, the sleep logic circuit 924 includes an OR gate 946 connected to a timer circuit 948 and a speed detection circuit 949 and the OR gate provides the sleep signal 932. The timer circuit 948 includes a counter 950 that counts the number of clock pulses received from the clock reference 952. The timer circuit 948 receives the motor control signal 928 which is inverted by the inverter 951 and acts as the reset signal to the counter 950. The counter value is compared by a digital comparator 954 to a timeout threshold value stored in a timeout threshold register 956. For example, if the number of clock pulses is greater than or equal to the timeout threshold value, a logic high voltage level is provided to the OR gate 946. In one example, the timer circuit 948 is used to wait a predetermined time (e.g., 1 ms) while the control signal at the multifunction port 916 is zero volts, for example, before engaging the sleep mode.

The speed detection circuit 949 determines when the speed of the motor 100 achieves a threshold speed based on the rotor commutation signal 78, for example, during braking when the speed of the motor 100 is reduced to the threshold speed. When a threshold speed is achieved a logic high voltage level, for example, is provided to the OR gate 946. In one embodiment, the speed detection circuit 949 is configured similar to the speed threshold comparator 250 in FIG. 4 except configured to measure a drop in motor speed. In other embodiments, the speed detection circuit 949 may be replaced with a timer circuit such as, for example, a timer circuit configured similar to the timer circuit 948. If either the timer circuit 948 or the speed detection circuit 949 provides a logic high voltage level, the OR gate 946 provides a sleep signal 932 having a logic high voltage level, for example, to the DLSS circuit 62.

In one example, the DLSS control circuit 62 may be used to convert the frequency of the motor control signal 928 to a frequency that is compatible with the H-bridge circuit 64. In this example, to convert a high frequency control signal to a lower frequency, the DLSS control circuit 62 divides down the high frequency while maintaining the integrity of the control signal. Having the DLSS control circuit 62 divide down the frequency is particular useful in fabricating the motor controller 10" in an IC in situations where IC fabrication processes limit the frequencies that may be received by the H-bridge circuits 64. In another example, the PWM signal is provided directly to the H-bridge circuit 64 by bypassing the DLSS control circuit 62.

Figure 15:
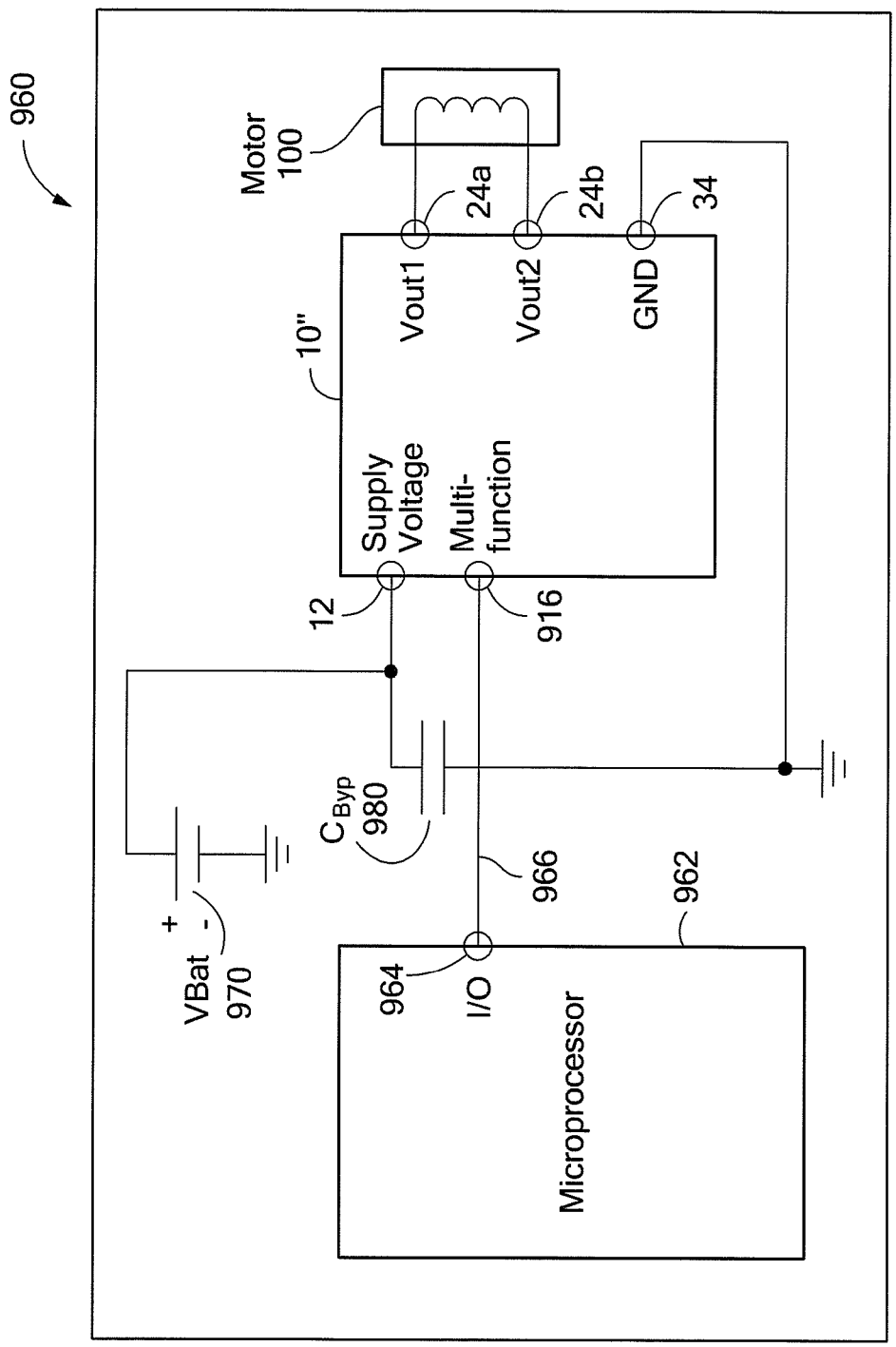
FIG. 15 is a circuit diagram of an application using the motor controller of FIG. 12.

Referring to FIG. 15, the motor controller 10" may be used in a system 960 that includes a microprocessor 962. The microprocessor 962 includes an input/output (I/O) port 964 that is connected to the multifunction port 916 by a connection 966. The microprocessor 962 may be configured to provide the control signal from the I/O port 964 to the multifunction port 916. The supply voltage is provided to the supply voltage port 12 by a battery 970. A capacitor 980 is connected to the supply voltage port 12, the battery 970 and ground. The capacitor 980 is a bypass capacitor and is used to prevent the current spikes generated by switching the output at high speeds during the PWM mode, for example, from corrupting the signal from the power supply.

In one example, the microprocessor 962 provides a control signal capable of controlling a brush motor so that the microprocessor designed to drive brush motors may be also used in conjunction with the motor controller 10" to drive brushless motors.

In one particular example, the system 960 is a cellular phone system and the motor 100 is a motor vibrator. Generally, motor vibrators are designed to start quickly by driving the H-bridge circuit 62 continuously during an acceleration period to a final motor velocity that is significantly higher than an optimum rate for the best vibration for the motor vibrator. Consequently, the PWM signal is used to lower the final motor velocity to a velocity that achieves the desired vibration level for the motor vibrator. By having a multifunction port 916 that receives a PWM signal externally allows for the motor speed to be varied by varying the PWM duty cycle of the PWM input signal. The multifunction port 916 further allows for many different vibration tones to be implemented in caller ID applications as opposed to an internally generated PWM input signal which regulates the motor 100 to only a single fixed motor speed (i.e., a single fixed vibration level).

Figure 16:
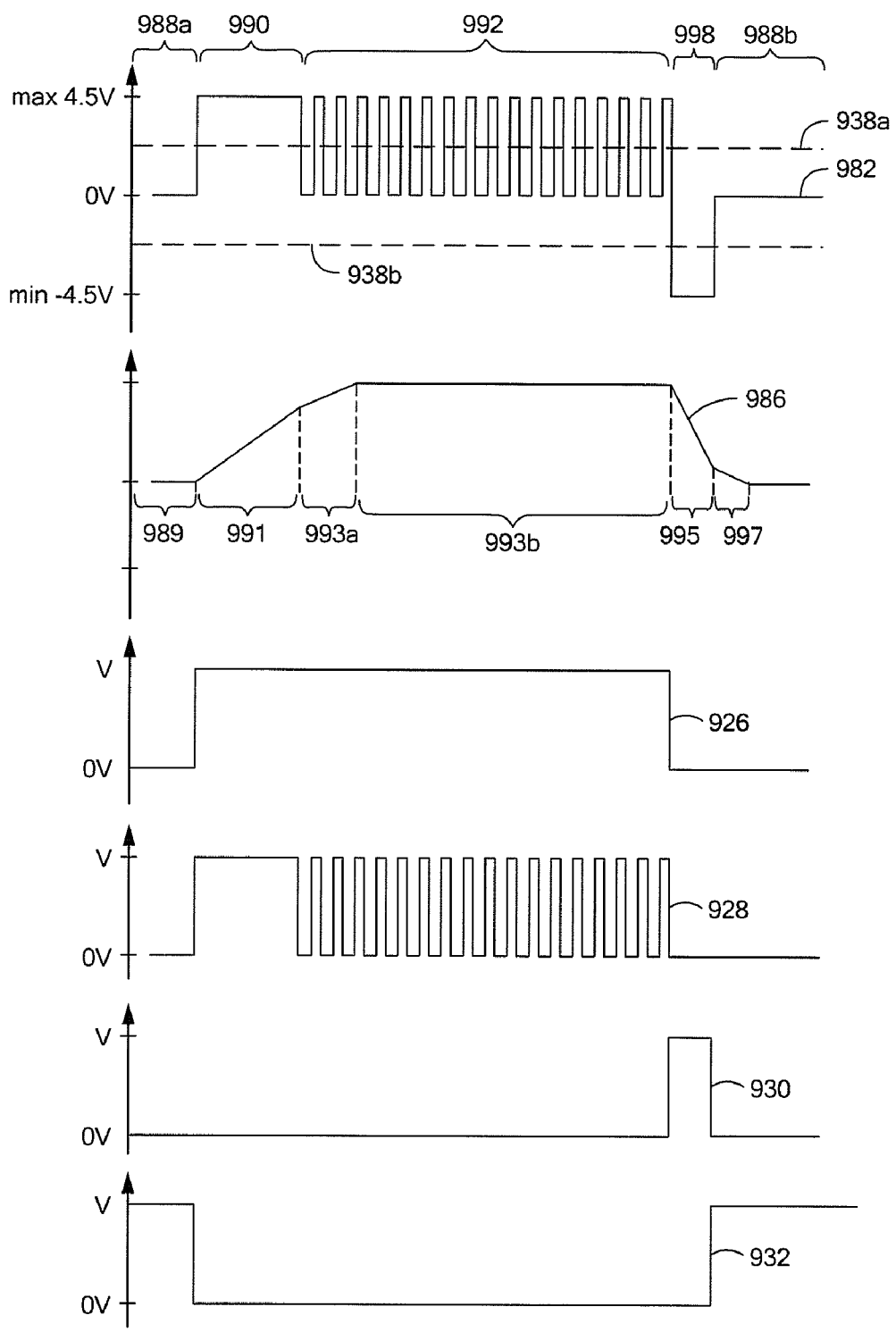
FIG. 16 is a timing diagram showing illustrative waveforms associated with the motor controller of FIG. 12.

Referring to FIG. 16, in one example, the microprocessor 962 may provide a control signal 982 to the multifunction port 916. In response to the control signal 982, the control logic circuit 920 provides the awake signal 926, the motor control signal 928, the brake signal 930 and the sleep signal 932. The corresponding response in motor velocity is provided in a velocity-over-time curve 986.

In one example, when control signal applied at the multifunction port 916 is between the threshold voltages 938a, 938b (e.g., zero volts or within +/−0.5 volts) for one millisecond, the sleep logic circuit 924 provides the sleep signal 932 to the DLSS control circuit 62 to place the motor controller 10″ in a sleep mode phase 988. For example, the brake signal 932 is a logic high voltage level. A corresponding velocity during the sleep mode phase 988a of the motor is zero as shown in a first portion 989 of the velocity-over-time curve 986. In one example, the motor control signal 928 provided to the sleep logic circuit 922 by the control logic circuit 920 removes the counter 950 from the reset mode. If the counter counts clock pulses that exceed the timeout threshold before reset (i.e., before the motor control signal 928 goes to a logic low voltage level, for example), the sleep logic circuit 924 provides the sleep signal 932.

When the multifunction port 916 receives a control signal having a logic high voltage level (e.g., 4.5 volts) that is above the positive threshold voltage 938a, the control logic circuit 920 provides the awake signal 926 to the DLSS control circuit 62 to run the motor 100 in a start mode phase 990. In one example, the control signal provided at the multifunction port 916 provides a signal to start the motor at 100% duty cycle. The corresponding velocity during the start mode 990 increases linearly as shown in a second portion 991 of the velocity-over-time curve 986. In one example, the awake signal 928 latches to a logic high voltage level and the sleep signal 932 transitions to a logic low voltage level.

When the multifunction port 916 receives a control signal that includes a PWM signal, the control logic circuit 920 provides the PWM signal as the motor control signal 928 to the DLSS control circuit 62 to place the motor 100 in a PWM mode phase 992 by changing the duty cycle of the motor 100 from the 100% duty cycle, for example, to a duty cycle corresponding to the duty cycle of the PWM signal. The corresponding velocity during the PWM mode phase 992 increases linearly as shown in a third portion 993a of the velocity-over-time curve 986 until it reaches the velocity corresponding to the PWM signal where it remains at a constant velocity as shown in a fourth portion 993b of the velocity-over-time curve.

When the multifunction port 916 receives a control signal having a logic negative high voltage level (e.g., −4.5 volts) that is less than the negative threshold voltage 938b, the control logic circuit 920 provides the brake signal 930 to the DLSS control circuit 62 to brake the motor 100 in a brake mode phase 998 using any one of the foregoing braking techniques. The corresponding velocity during the start mode 990 decreases linearly as shown in a fifth portion 995 of the velocity-over-time curve 986. In one example, the awake signal 926 and the motor control signal 928 transition to a logic low voltage level (e.g., at or near zero volts) and the brake signal 930 transitions to a logic high voltage level.

The brake signal 930 is also provided to the sleep logic circuit 924 and in particular to the speed detection circuit 949 to determine when the speed achieves a threshold speed. When the threshold speed is achieved, the sleep logic circuit 924 provides the sleep signal 932 to the DLSS circuit 62 to go to a sleep mode phase 988b, for example the sleep signal transitions to a logic high voltage level. A corresponding velocity during the sleep mode phase 988b decreases linearly until the motor velocity is zero as shown in a sixth portion 997 of the velocity-over-time curve 986. The brake signal 930 transitions to a low logic voltage level.

Figure 17:
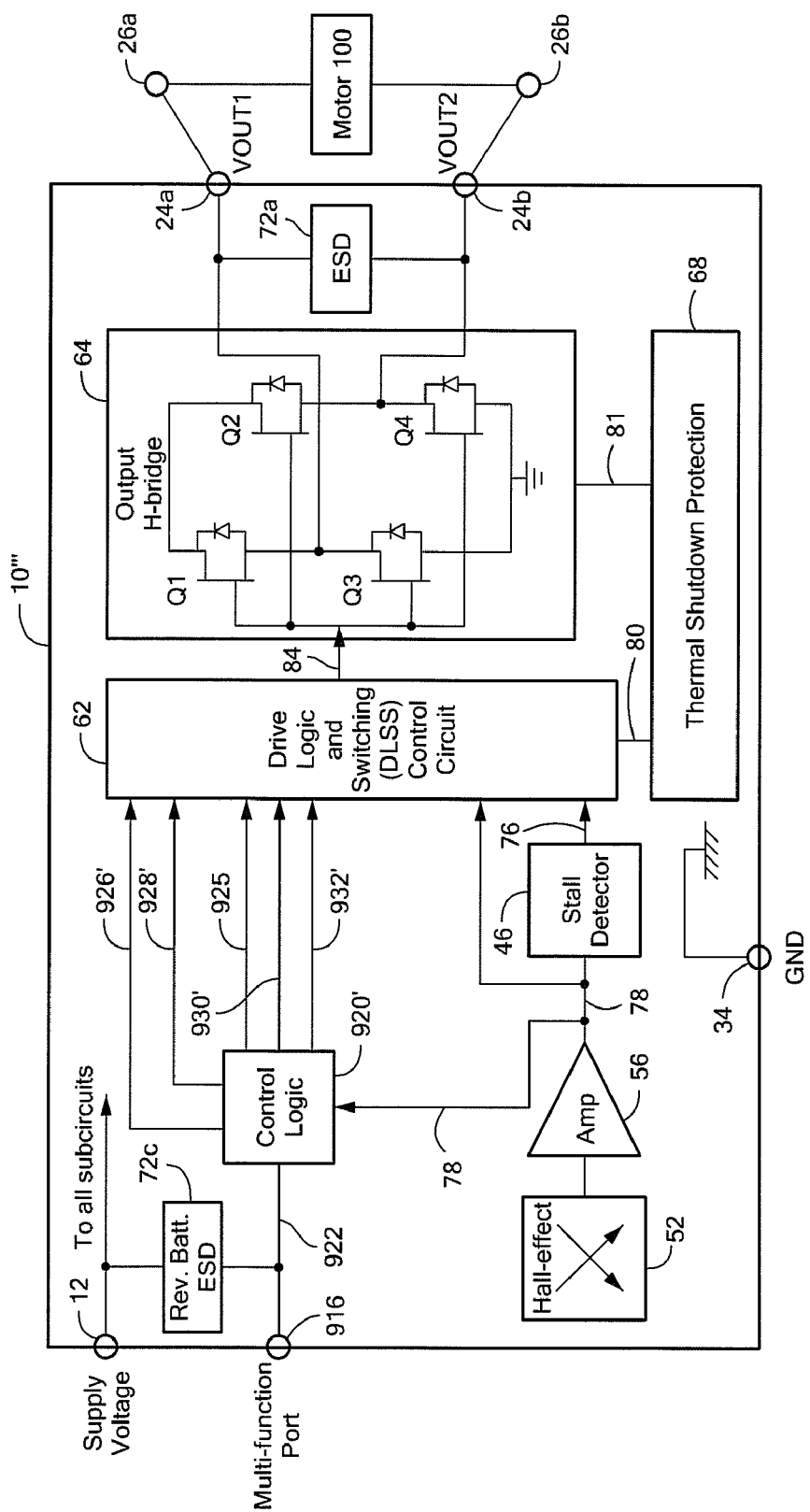
FIG. 17 is a circuit diagram of a further alternative embodiment of the motor controller of FIG. 12 having the multifunction port.

Referring to FIG. 17, other embodiments of the motor controller 10 include a motor controller 10‴. The motor controller 10‴ includes a control logic circuit 920′. The control logic circuit 920′ is connected to the multifunction port 916 by a connection 922 and to the DLSS control circuit 62 by a connection 925, a connection 926′, a connection 928′, a connection 930′ and a connection 932′. The control logic circuit 920′ receives the rotor commutation signal through the connection 78. In this embodiment, a negative voltage applied to multifunction port 916 that is greater negatively than the negative threshold voltage 938b, causes the motor 100 to operate in a reverse direction. Braking is enabled if the voltage applied at the multifunction port 916 is between the positive threshold voltage 938a and the negative threshold voltage 938b for a predetermined period of time.

In one example, the connection 925 provides a motor direction signal, the connection 926′ provides the awake signal, the connection 928′ provides the motor control signal (e.g., a PWM signal), the connection 930′ provides the brake signal and the connection 932′ provides the sleep signal. In one logic state, the motor direction signal 925 changes the rotational direction of the motor 100. For example, when the motor direction signal 925 is in one logic state, the motor 100 rotates in one direction and when the motor control signal 925 is in the opposite logic state, the motor rotates in the opposite direction.

In one logic state, the awake signal 926′ provided to the DLSS control circuit 62 turns on the motor 100 from a sleep mode. In one example, the awake signal 926′ provided to the DLSS control circuit 62 starts the motor at a 100% duty cycle, for example.

In one logic state, the motor control signal 928′ provided to the DLSS control circuit 62 controls the motor speed and the brake signal 930′ provided to the DLSS control circuit brakes the motor 100. In one logic state, the sleep signal 932′ provided to the DLSS control circuit 62 places the motor controller 10‴ in the sleep mode.

Figure 18:
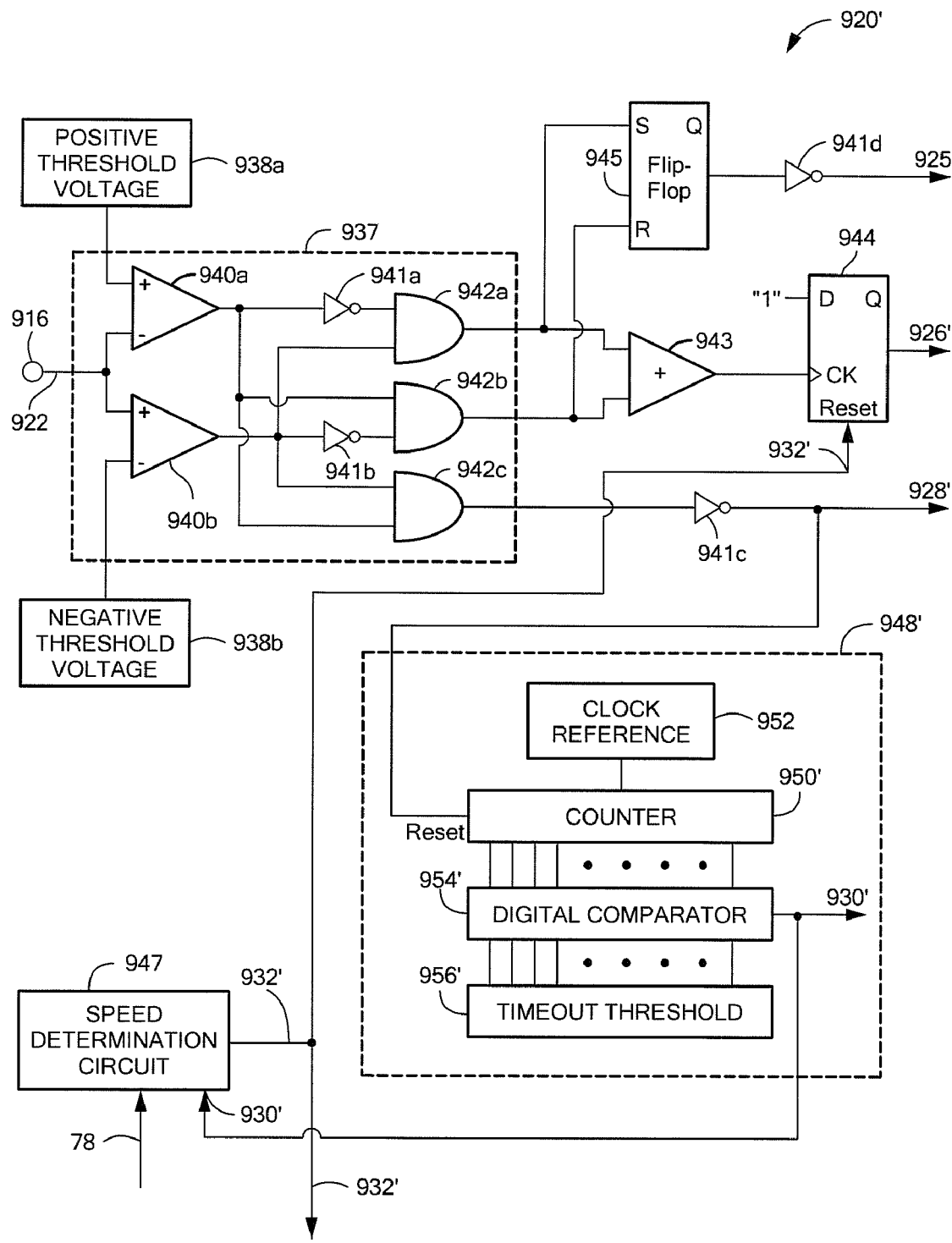
FIG. 18 is a circuit diagram of an embodiment of the control logic circuit of the motor controller of FIG. 17.

Referring to FIG. 18, in one example, the control logic circuit 920′ includes the window comparator circuit 937 (FIG. 13), an OR gate 943, an S-R flip-flop 945, a speed determination circuit 947 and a timer circuit 948′. The output of the AND gate 942a and the output of the AND gate 942b from the window comparator circuit 937 are connected to the OR gate 943 and to the S-R flip-flop 945. The S-R flip-flop 945 is connected to an inverter 941d. The output of the inverter 941d provides the motor direction signal 925. The motor direction signal 925 changes the direction of the motor 100 when the control signal applied at the multifunction port 916 changes from a positive voltage to a negative voltage and visa-versa.

The OR gate 943 is connected to the latch circuit 944. The output of the latch circuit 944 provides the awake signal 926'. The latch circuit 44 is reset by the sleep signal 932' provided by the speed determination circuit 947. In one example, if either the output of the AND 942a or the output of the AND gate 942b is a high logic state, then the output of the latch circuit 944 provides the awake signal 926' having a high logic state until the latch circuit is reset by the sleep signal 932' having a high logic state.

The output of the AND gate 942c is connected to an inverter 941c. The output of the inverter 941c provides the motor control signal 928

The output of the inverter 941c is connected to the timer circuit 948' such as the timer circuit 948 (FIG. 14), for example. The timer circuit 948' includes a counter 950' that counts the number of clock pulses received from the clock reference 952'. The timer circuit 948' receives the motor control signal 928', which acts as the reset signal to the counter 950'. The counter value is compared by a digital comparator 954' to a timeout threshold value stored in a timeout threshold register 956'. The output of the digital comparator 954' provides the brake signal 930'. For example, if the number of clock pulses received by the timer circuit 948' before being reset is greater than or equal to the timeout threshold value, a logic high voltage level is provided. In one example, the timer circuit 948' is used to wait a predetermined time (e.g., 1 ms) while the control signal at the multifunction port 916 is between the positive threshold 938a and the negative threshold voltage 938b, for example, before providing the brake signal 930' to engage the brake mode.

The speed determination circuit 947 receives the rotor commutation signal 78 and the brake signal 930'. The brake signal 930' enables the speed determination circuit 947 to determine when the motor velocity is reduced to a threshold speed based on the rotor commutation signal 78. When the motor velocity reaches the speed threshold, the speed determination circuit 947 provides the sleep signal 932' having a high logic voltage state, for example.

In one example, from a sleep mode, the multifunction port 916 receives a signal having a voltage level greater than the positive threshold voltage 938a or a voltage level below the negative threshold voltage 938b. Correspondingly, the output of the AND gate 942a becomes a logic high voltage level, for example, and the output from the AND logic gates 942b, 942c become a low logic voltage level, for example. The latch circuit 944 latches to a logic high voltage level, for example, and provides the awake signal 928 at a high logic state. The output of latch circuit 944 will remain latched until reset, for example, by a logic high voltage level from the sleep signal 932.

If the control signal received at the multifunction port 916 is between the positive threshold voltage 938a and the negative threshold voltage 938b, the motor control signal 928' is at a logic high voltage level while the brake signal 930' is at a logic low voltage level, for example. The motor control signal 928' is proportional to the control signal received at the multifunction port 916. Brake signal 932' is set to a logic high voltage state when the control signal applied to the multifunction port 916 remains between the positive threshold voltage 938a and the negative threshold voltage 938b for a predetermined amount of time corresponding to the threshold value stored in the timeout threshold register 956'.

If the control signal received at the multifunction port 916 is below the negative threshold voltage 938b (i.e., goes from a positive voltage to a negative voltage), then the motor direction signal 925 is a logic high voltage level, for example. For example, if the multifunction port 916 receives a negative logic high voltage level, the control circuit 926' sends the motor control direction signal 925 to the DLSS control circuit 62 to reverse the rotation of the motor 100.

Figure 19:
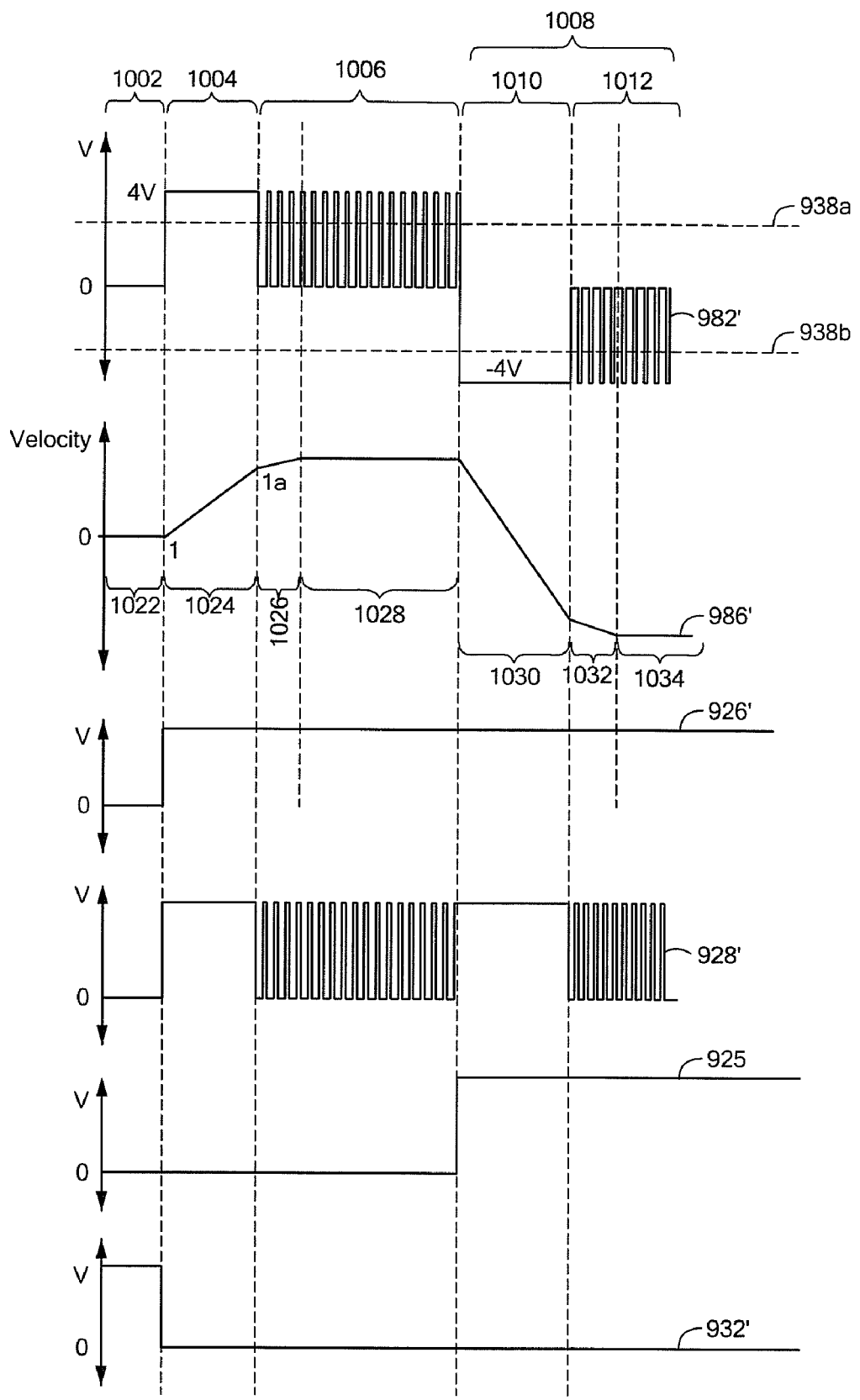
FIG. 19 is a timing diagram showing illustrative waveforms associated with the motor controller of FIG. 17.

FIG. 19 shows an example of using the multifunction port 916 to control the rotational direction of the motor 100. In one example, the microprocessor 962 (FIG. 15) may provide a control signal 982' to the multifunction port 916 of motor controller 10'''. In response to the control signal 982', the control logic circuit 920' provides the awake signal 926', the motor control signal 928', the brake signal 930' and the sleep signal 932'. The corresponding response in motor velocity is provided in a velocity-over-time curve 986'.

A 100% duty cycle control signal provided at the multifunction port 916 that is greater than the positive threshold voltage 938a drives the motor 100 into full acceleration. Once the PWM signal is applied at the multifunction port 916, the acceleration will decrease and the motor velocity 986 stabilizes. The motor velocity 986' is proportional to the applied duty cycle of PWM signal at the multifunction port 916. In this example, when the voltage of the control signal 982' is below the negative threshold voltage 938b, the motor direction signal 925 changes the motor control signals 84 to change the direction of rotation of the motor 100. The PWM signal may be applied in negative voltage as well, so that the duty cycle of the signal dictates the speed in a reverse direction.

For example, the speed determination circuit 947 provides the sleep signal 932' to the DLSS control circuit 62 to place the motor controller 10''' in a sleep mode phase 1002 when the motor velocity 986' is reduced below the threshold voltage (e.g., as determined by the value stored in the timeout threshold register 956'). For example, the sleep signal 932' is a logic high voltage level. A corresponding velocity during the sleep mode phase 988a of the motor is zero as shown in a first portion 1022 of the velocity-over-time curve 986'.

When the multifunction port 916 receives a logic high voltage level (e.g., 4.5 volts) that is above the positive threshold voltage 938a, the control logic circuit 920' provides the awake signal 926' to the DLSS control circuit 62 to run the motor 100 in a start mode phase 1024. In one example, the control signal 982' provided at the multifunction port 916 provides a signal to start the motor at 100% duty cycle. The corresponding velocity during the start mode 1004 increases linearly as shown in a second portion 1024 of the velocity-over-time curve 986'. In one example, the awake signal 928' latches to a logic high voltage level and the sleep signal 932' transitions to a logic low voltage level.

When the multifunction port 916 receives a control signal 982' that includes a PWM signal, the control logic circuit 920 provides the PWM signal as the motor control signal 928' to the DLSS control circuit 62 to place the motor 100 in a PWM mode phase 1006 by changing the duty cycle of the motor 100 from the 100% duty cycle, for example, to a duty cycle corresponding to the duty cycle of the PWM signal. The corresponding velocity during the PWM mode phase 1006 increases linearly (at a reduced acceleration than the 100% duty cycle) as shown in a third portion 1026 of the velocity-over-time curve 986 until it reaches the velocity corresponding to the PWM signal where it remains at a constant velocity as shown in a fourth portion 1028 of the velocity-over-time curve.

When the multifunction port 916 receives a control signal 982' having a logic negative high voltage level (e.g., −4.5 Volts) that is less than the negative threshold voltage 938b, the control logic circuit 920' provides the motor control signal 925 to the DLSS control circuit 62 to reverse direction of the motor 100 in a reverse mode phase 1008. The first portion 1010 of the reverse mode phase 1008 reverses the direction of the motor at a 100% duty cycle corresponding to the control signal 982'. The corresponding velocity during the first portion 1010 of the reverse mode phase 1008 increases linearly in the negative direction as shown in a fifth portion 1030 of the velocity-over-time curve 986. The second portion 1012 of the reverse mode phase 1008 reverses the direction of the motor at a PWM duty cycle corresponding to the control signal 982'. The corresponding velocity during the second portion 1012 of the reverse mode phase 1008 increases linearly in the negative direction (at a reduced acceleration than the 100% duty cycle) as shown in a sixth portion 1032 of the velocity-over-time curve 986' where it remains at a constant velocity as shown in a seventh portion 1034 of the velocity-over-time curve 986.

Figure 20:
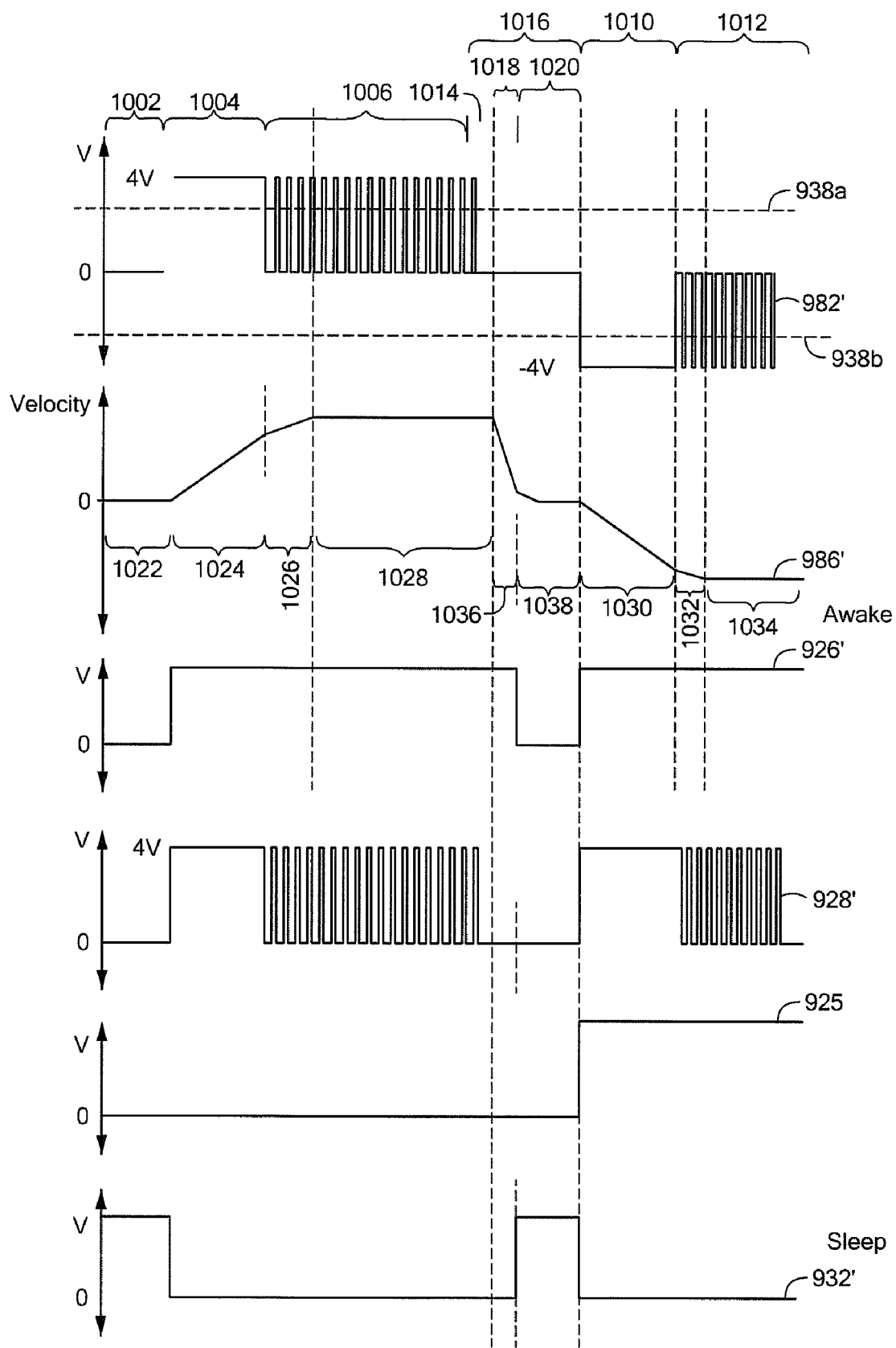
FIG. 20 is another timing diagram showing illustrative waveforms associated with the motor controller of FIG. 17.

FIG. 20 is an example of braking when the control signal applied at the multifunction port 916 of the motor controller 10''' by the microprocessor 962 (FIG. 15) is between the positive threshold voltage 938a and the negative threshold voltage 938b for longer than a predetermined amount of time, which will set the brake signal 932' to a high logic state. Once motor 100 starts braking, the motor velocity decreases. Once the velocity drops under the speed threshold, the speed determination circuit 947 sets the sleep signal 932' to a logic high voltage and the DLSS 62 engages the sleep mode. For simplicity, reference numbers and the corresponding description are the same in FIG. 20 as in FIG. 19 except for the differences described further below.

For example, when the control signal 982' provided at the multifunction port 916 is a voltage between the threshold voltages 938a, 938b (e.g., zero volts or within +/−0.5 volts) for a predetermined time (e.g., the portion 1014 on the control signal 982'), the timer circuit 924' provides the brake signal 930' to the DLSS control circuit 62 to brake the motor 100 in a brake mode phase 1016 using any number of the foregoing techniques to brake a motor including reversing rotational direction of the motor. In one example, the brake signal 930' is a logic high voltage level. A corresponding velocity during a first portion 1018 of the brake mode phase 1016 decreases linearly until the velocity reaches a threshold velocity as shown in a portion 1036 of the velocity-over-time curve 986'. Once the threshold velocity is achieved, the speed determination circuit 947, enabled by the brake signal 930', provides the sleep signal 932' to the DLSS 62 to engage the sleep mode. A corresponding velocity during a second portion 1020 of the brake mode phase 1016 decreases linearly (but with less acceleration than the first portion 1018) until the motor velocity reaches zero as shown in a portion 1038 of the velocity-over-time curve 986'.

Elements of different embodiments described herein may be combined to form other embodiments not specifically set forth above. Other embodiments not specifically described herein are also within the scope of the following claims.

What is claimed is:

1. A control circuit to control a speed of a motor, comprising:
a PWM oscillator configured to generate a PWM output signal having a duty cycle, wherein the speed of the motor is controlled by the PWM output signal to be proportional to the duty cycle; and
a duty cycle control circuit responsive to a duty cycle selection signal and coupled to the PWM oscillator, the duty cycle control circuit being configured to compare a voltage reference and a supply voltage,
wherein the duty cycle control circuit controls the duty cycle of the PWM output signal to be inversely proportional to the supply voltage, and
wherein the speed of the motor is substantially constant with respect to variations in the supply voltage.

2. The circuit of claim 1, further comprising a comparator configured to compare a second voltage reference to the duty cycle selection signal to generate a comparator output signal coupled to the duty cycle control circuit.

3. The circuit of claim 1, further comprising an enable circuit having an input coupled to the PWM oscillator and an output at which the PWM output signal is provided in response to an enable signal.

4. The circuit of claim 1, further comprising a PWIIVI sequencer comprising the PWM oscillator and the duty cycle control circuit.

5. The circuit of claim 1 wherein the speed of the motor is determined from a rotor commutation signal generated from a magnetic field sensor sensing a magnetic field generated by the motor.

6. A control circuit to control a speed of a motor, comprising:
a timer configured to measure from a first time based on an activation signal and to provide an enable signal based on the timer reaching a second time, wherein the second time occurs after a predetermined amount of time has elapsed following the first time; and
a PWM sequencer responsive to a duty cycle selection signal and configured to generate a PWM output signal having a duty cycle, wherein the speed of the motor is controlled by the PWM output signal to be proportional to the duty cycle,
wherein the PWM output signal is generated in response to the enable signal and the duty cycle selection signal.

7. The circuit of claim 6, further comprising circuitry configured to receive an input signal provided by a user and configured to provide the activation signal based on the input signal.

8. The circuit of claim 6 wherein the speed of the motor is initially proportional to a 100 percent duty cycle and wherein the speed of the motor is proportional to the duty cycle of the PWM output signal after the timer reaches the second time.

9. The circuit of claim 6 wherein the PWM sequencer comprises:
a PWM oscillator configured to generate the PWM output signal; and
a duty cycle control circuit coupled to the PWM oscillator, wherein the duty cycle control circuit is configured to compare a voltage reference to the duty cycle selection signal.

10. The circuit of claim 9, further comprising an enable circuit having an input coupled to the PWM oscillator and an output at which the PWM output signal is provided in response to the enable signal.

11. The circuit of claim 6 wherein the speed of the motor is determined from a rotor commutation signal generated from a magnetic field sensor sensing a magnetic field generated by the motor.

12. A control circuit configured to control a speed of a motor, comprising:
comparator circuitry configured to evaluate a rotor commutation signal having a frequency proportional to the speed of the motor using a clock reference signal having a fixed frequency and to provide an enable signal in response to the evaluation; and
a PWM sequencer configured to generate a PWM output signal having a duty cycle, wherein the speed of the motor is controlled by the PWM output signal to be proportional to the duty cycle, and wherein the PWM output signal is determined by the duty cycle selection signal in response to a transition of the enable signal.

13. The circuit of claim 12 wherein the enable signal is at a first logic level when the frequency of the rotor commutation signal is equal to or greater than the fixed frequency and wherein the enable signal is at a second logic level when the frequency of the rotor commutation signal is less than the fixed frequency.

14. The circuit of claim 12 wherein the comparator circuitry comprises:

a counter responsive to the rotor commutation signal and to the clock reference signal to generate a count signal indicative of a number of pulses of the rotor commutation signal occurring within a predetermined time period equal to a time duration of a clock pulse from the clock reference signal; and a comparator configured to provide the enable signal in response to a comparison between the count signal and a predetermined threshold value.

15. The circuit of claim 12 wherein the comparator circuitry comprises:

a counter responsive to the clock reference signal to generate a count signal indicative of a number of pulses of the clock reference signal while the rotor commutation signal is in a first logic state; and a comparator configured to provide the enable signal in response to a comparison of the count signal and a predetermined threshold value, wherein the counter is reset when the rotor commutation signal is in a second logic state, the second logic state being an alternative to the first logic state.

16. The circuit of claim 12 wherein the comparator circuitry comprises:

a capacitor; and a voltage comparator configured to provide the enable signal based on a comparison of the voltage across the capacitor and a fixed voltage reference.

17. The circuit of claim 16 wherein a lower voltage across the capacitor than the fixed reference voltage corresponds to a high motor speed and a lower voltage across the capacitor than the fixed reference voltage corresponds to a low motor speed.

18. The circuit of claim 16, further comprising a current source coupled to the capacitor and configured to be enabled to charge the capacitor in response to receiving an activation signal from sleep control circuitry configured to receive a sleep signal.

19. The circuit of claim 16, further comprising reset circuitry configured to provide a reset signal to discharge the capacitor.

20. The circuit of claim 19 wherein the reset circuitry comprises an AND gate coupled to a one-shot generator configured to receive the rotor commutation signal and coupled to the sleep control circuitry, the AND gate configured to provide the reset signal based on the rotor commutation signal and the activation signal.

21. The circuit of claim 12 wherein the rotor commutation signal is generated from a magnetic field sensor sensing a magnetic field generated by the motor.

22. A control circuit to control a speed of a motor, comprising:

speed detection circuitry to detect the speed of the motor, comprising:

comparator circuitry configured to receive a clock reference signal having a fixed frequency and a rotor commutation signal having a frequency proportional to the speed of the motor and to provide a brake enable signal in response to the speed of the motor being below a predetermined threshold; and power control circuitry configured to place transistors in an H-bridge circuit in an off state based on the brake enable signal.

23. The circuit of claim 22 further comprising a driving and braking logic circuit configured to receive a sleep signal and to provide a motor direction signal to the motor to reduce the speed of the motor based on the sleep signal, wherein the driving and braking logic circuit is configured to provide a braking signal based on the sleep signal, and wherein the motor direction signal reverses a rotational direction of the motor.

24. The circuit of claim 23 wherein the power control circuitry is configured to place transistors in an H-bridge circuit in an off state based on the brake enable signal and the braking signal.

25. The circuit of claim 22 wherein the rotor commutation signal is generated from a magnetic field sensor sensing a magnetic field generated by the motor.

\* \* \* \* \*

UNITED STATES PATENT AND TRADEMARK OFFICE
CERTIFICATE OF CORRECTION

PATENT NO. : 7,590,334 B2  Page 1 of 1
APPLICATION NO. : 11/835721
DATED : September 15, 2009
INVENTOR(S) : Yabusaki et al.

It is certified that error appears in the above-identified patent and that said Letters Patent is hereby corrected as shown below:

Column 14, line 43, delete "particular" and replace with -- particularly --.

Column 15, line 24, delete ", when control" and replace with -- , when the control --.

Column 17, line 2, delete "visa-versa" and replace with -- vice versa --.

Column 17, line 7, delete "AND 942a" and replace with -- AND gate 942a --.

Column 17, line 14, delete "signal 928" and replace with -- signal 928. --.

Column 17, line 30, delete "positive threshold 938a" and replace with
    -- positive threshold voltage 938a --.

Column 18, line 21, delete "of PWM" and replace with -- of the PWM --.

Column 18, line 59, delete "curve 986" and replace with -- curve 986' --.

Column 19, line 16, delete "curve 986." and replace with -- curve 986'. --.

Column 20, line 14, delete "PWIIVI" and replace with -- PWM --.

Signed and Sealed this

Tenth Day of November, 2009

David J. Kappos
*Director of the United States Patent and Trademark Office*